(12) United States Patent
Karthik et al.

(10) Patent No.: US 9,020,050 B2
(45) Date of Patent: *Apr. 28, 2015

(54) ACCOUNTING FOR INTER-CARRIER INTERFERENCE IN DETERMINING A RESPONSE OF AN OFDM COMMUNICATION CHANNEL

(75) Inventors: Muralidhar Karthik, Singapore (SG); George A. Vlantis, Sunnyvale, CA (US)

(73) Assignees: STMicroelectronics, Inc., Coppell, TX (US); STMicroelectronics Asia Pacific Pte. Ltd., Singapore (SG)

( * ) Notice: Subject to any disclaimer, the term of this patent is extended or adjusted under 35 U.S.C. 154(b) by 899 days.
This patent is subject to a terminal disclaimer.

(21) Appl. No.: 12/963,569

(22) Filed: Dec. 8, 2010

(65) Prior Publication Data

US 2011/0129024 A1    Jun. 2, 2011

Related U.S. Application Data

(63) Continuation-in-part of application No. 12/579,935, filed on Oct. 15, 2009, and a continuation-in-part of application No. 12/579,969, filed on Oct. 15, 2009.

(60) Provisional application No. 61/105,704, filed on Oct.
(Continued)

(51) Int. Cl.
*H04K 1/10*         (2006.01)
*H04L 25/02*        (2006.01)
(Continued)

(52) U.S. Cl.
CPC .......... *H04L 25/022* (2013.01); *H04L 25/0204* (2013.01); *H04L 25/0224* (2013.01); *H04L 25/03821* (2013.01); *H04L 27/2601* (2013.01)

(58) Field of Classification Search
CPC .............. H04L 25/022; H04L 27/2601; H04L 25/03821

USPC ......... 375/260, 259, 316, 340, 148, 229, 243; 370/330
See application file for complete search history.

(56) References Cited

U.S. PATENT DOCUMENTS 5,479,446 A  * 12/1995 Mourot ......................... 375/243
5,852,630 A    12/1998 Langberg et al.
(Continued)

FOREIGN PATENT DOCUMENTS

CN        101026606        8/2007

OTHER PUBLICATIONS

Steven M. Kay, "Fundamentals of Statistical Signal Processing—Estimation Theory", Prentice Hall Signal Processing Series, 1993, vol. 1, Chapter 8, pp. 219-288.
(Continued)

*Primary Examiner* — Shuwang Liu
*Assistant Examiner* — Helene Tayong
(74) *Attorney, Agent, or Firm* — Allen, Dyer, Doppelt, Milbrath & Gilchrist, P.A.

(57) ABSTRACT

In an embodiment, a channel estimator includes first and second stages. The first stage is operable to generate a respective one-dimensional array of first channel-estimation coefficients for each communication path of a communication channel, and the second stage is operable to generate a multi-dimensional array of second channel-estimation coefficients in response to the first channel-estimation coefficients. For example, such a channel estimator may estimate the response of a channel over which propagates an orthogonal-frequency-division-multiplexed (OFDM) signal that suffers from inter-carrier interference (ICI) due to Doppler spread. Such a channel estimator may estimate the channel response more efficiently, and with a simpler algorithm, than conventional channel estimators. Furthermore, such a channel estimator may be able to dynamically account for changes in the number of communication paths that compose the channel, for changes in the delays of these paths, or the portions of the transmitted symbol energy carried by these paths.

34 Claims, 11 Drawing Sheets

Related U.S. Application Data 15, 2008, provisional application No. 61/158,290, filed on Mar. 6, 2009, provisional application No. 61/267,667, filed on Dec. 8, 2009, provisional application No. 61/360,367, filed on Jun. 30, 2010.

(51) Int. Cl.
*H04L 25/03* (2006.01)
*H04L 27/26* (2006.01)

(56) References Cited

U.S. PATENT DOCUMENTS

| | | | |
|---|---|---|---|
| 6,680,901 B1 | 1/2004 | Yamamoto et al. | |
| 8,098,713 B2 | 1/2012 | Baxley et al. | |
| 8,170,516 B2 | 5/2012 | Dehos et al. | |
| 8,428,158 B2 | 4/2013 | Maltsev et al. | |
| 2002/0146063 A1* | 10/2002 | Gorokhov et al. | 375/148 |
| 2002/0181407 A1 | 12/2002 | Khullar et al. | |
| 2005/0147024 A1 | 7/2005 | Jung et al. | |
| 2005/0201268 A1 | 9/2005 | Aoki et al. | |
| 2006/0013326 A1* | 1/2006 | Yoshida | 375/260 |
| 2006/0072692 A1 | 4/2006 | Gifford et al. | |
| 2006/0133457 A1* | 6/2006 | Wang et al. | 375/148 |
| 2006/0209973 A1 | 9/2006 | Gorokhov et al. | |
| 2006/0209979 A1 | 9/2006 | Sandell et al. | |
| 2006/0291372 A1 | 12/2006 | Koo et al. | |
| 2007/0133696 A1 | 6/2007 | Iancu et al. | |
| 2007/0133699 A1 | 6/2007 | Roh et al. | |
| 2007/0248151 A1 | 10/2007 | Kim et al. | |
| 2007/0297522 A1 | 12/2007 | Baggen et al. | |
| 2008/0144486 A1 | 6/2008 | Wilhelmsson et al. | |
| 2008/0219343 A1 | 9/2008 | Wu et al. | |
| 2008/0225934 A1 | 9/2008 | Mourad et al. | |
| 2009/0052566 A1 | 2/2009 | Maltsev et al. | |
| 2009/0103568 A1 | 4/2009 | Garba et al. | |
| 2009/0154625 A1 | 6/2009 | Kwak et al. | |
| 2009/0239494 A1* | 9/2009 | Park et al. | 455/278.1 |
| 2009/0279623 A1 | 11/2009 | Wu et al. | |
| 2010/0027698 A1* | 2/2010 | Kim et al. | 375/260 |
| 2010/0098198 A1 | 4/2010 | Muralidhar et al. | |
| 2010/0103877 A1 | 4/2010 | Wang et al. | |
| 2010/0166118 A1 | 7/2010 | Mantravadi et al. | |
| 2011/0149929 A1 | 6/2011 | Kleider et al. | |
| 2011/0176626 A1 | 7/2011 | Liao et al. | |
| 2011/0211630 A1 | 9/2011 | Nakahara et al. | |
| 2012/0045008 A1 | 2/2012 | Karthik et al. | |
| 2012/0114069 A1 | 5/2012 | Karthik et al. | |
| 2012/0155425 A1* | 6/2012 | Budianu et al. | 370/330 |
| 2013/0235946 A1 | 9/2013 | Budianu et al. | |
| 2013/0279627 A1 | 10/2013 | Wu et al. | |

OTHER PUBLICATIONS

Steven M. Kay, "Fundamentals of Statistical Signal Processing—Estimation Theory", Prentice Hall Signal Processing Series, 1993, vol. 1, Chapter 12, pp. 379-418.
DVB Mobile TV—DVB-H—DVB-SH—DVB-IPDC, http://www.dvb-h.org/ p. 1.
IEEE 802.11—Wikipedia, the free encyclopedia, http://en.wikipedia.org/wiki/IEEE_802.11, p. 13.
IEEE 802.16—Wikipedia, the free encyclopedia, http://en.wikipedia.org/wiki/IEEE_802.16, p. 1.
3GPP Long Term Evolution—Wikipedia, the free encyclopedia, http://en.wikipedia.org/wiki/3GPP_Long_Term_Evolution, p. 1.
IEEE 802.22 WRAN WG Home Page, IEEE 802.22 Working Group on Wireless Regional Area Networks Enabling Rural Broadband Wireless Access Using Cognitive Radio Technology in TV Whitespaces, http://www.ieee802.org/22/, pp. 2.
Rocco Claudio Cannizzaro, Paolo Banelli, and Geert Leus, "Adaptive Channel Estimation for OFDM Systems with Doppler spread", IEEE Signal Processing Advances in Wireless Communications, Jul. 2006, pp. 5.
Karthik Muralidhar and Kwok Hung Li, "A Low-Complexity Kalman Approach for Channel Estimation in Doubly-Selective OFDM Systems", IEEE Signal Processing Letters, vol. 16, No. 7, Jul. 2009, pp. 632-635.
Karthik Muralidhar, Evelyn Kurniawati, Samsudin NG, "Further Results on the VSSO Kalman Channel Estimator for Doubly-Selective OFDM Systems", pp. 4.
Osvaldo Simeone, Yeheskel Bar-Ness, and Umberto Spagnolini, "Pilot-Based Channel Estimation for OFDM Systems by Tracking the Delay-Subspace", IEEE Transactions on Wireless Communications, vol. 3, No. 1, Jan. 2004, pp. 315-325.
Zijian Tang, Rocco Claudio Cannizzaro, Geert Leus, and Paolo Banelli, "Pilot-Assisted Time-Varying Channel Estimation for OFDM Systems", IEEE Transactions on Signal Processing, vol. 55, No. 5, May 2007, pp. 2226-2238.
M. R. Raghavendra, S. Bhashyam, and K. Giridhar, "Exploiting Hopping Pilots for Parametric Channel Estimation in OFDM Systems", IEEE Signal Processing Letters, vol. 12, No. 11, Nov. 2005, pp. 737-740.
Baoguo Yang, Khaled Ben Letaief, Roger S. Cheng, and Zhigang Cao, "Channel Estimation for OFDM Transmission in Multipath Fading Channels Based on Parametric Channel Modeling", IEEE Transactions on Communications, vol. 49, No. 3, Mar. 2001, pp. 467-479.
Karkarthik Muralidhar, Li Kwok Hung and Ying Chang Liang, "Low-Complexity Equalisation Methods for OFDM Systems in doubly Selective Channels", Vehicular Technology Conference, 2008. VCT Spring 2008. IEEE, May 11-14, 2008, Singapore, pp. 683-687.
S. M. Kay, "Fundamentals of Statistical signal processing: Estimation Theory," vol. 1, Prentice Hall: New Jersey, 1993, pp. 6.
Proakis, "Digital Communications," McGraw Hill, 1995, pp. 4.
Xiaodong Cai and Georgios B. Giannakis, "Bounding Performance and Suppressing Intercarrier Interference in Wireless Mobile OFDM", IEEE Transactions on Communications, vol. 51, No. 12, Dec. 2003, pp. 2047-2056.
Paolo Banelli, Rocco Claudio Cannizzaro, and Luca Rugini, "Data-Aided Kalman Tracking for Channel Estimation in Doppler-Affected OFDM Systems", ICASSP 2007, IEEE 2007, pp. 133-136.
Hongmei Wang, Xiang Chen, Shidong Zhou, Ming Zhao, and Yan Yao, "Letter—Low-Complexity ICI Cancellation in Frequency Domain for OFDM Systems in Time-Varying Multipath Channels", IEICE Trans. Commun., vol. E89-B, No. 3, Mar. 2006, pp. 1020-1023.
U.S. Appl. No. 12/579,935, entitled: "Recovery of Data From a Multi Carrier Signal", filed Oct. 15, 2009, pp. 52.
U.S. Appl. No. 12/579,969, entitled: "Recovery of Data From a Multi Carrier Signal", filed Oct. 15, 2009, pp. 55.
Karthik Muralidhar and D. Sreedhar, "Pilot Design for Vector State-Scalar Observation Kalman Channel Estimators in Doubly-Selective MIMO-OFDM Systems", IEEE Wireless Communications Letters, vol. 2, No. 2, Apr. 2013, 4 pages.
DVB Mobile TV—DVB-H—DVB-SH—DVB-IPDC, http://www.dvb-h.org/ p. 1: Retrieved From Internet Feb. 9, 2011.
IEEE 802.11—Wikipedia, the free encyclopedia, http://en.wikipedia.org/wiki/IEEE_802.11, pp. 13: Retrieved From Internet Feb. 9, 2011.
IEEE 802.16—Wikipedia, the free encyclopedia, http://en.wikipedia.org/wiki/IEEE_802.16, p. 1: Retrieved From Internet Feb. 9, 2011.
3GPP Long Term Evolution—Wikipedia, the free encyclopedia, http://en.wikipedia.org/ wiki/3GPP Long_Term_Evolution, p. 1: Retrieved From Internet Feb. 9, 2011.
IEEE 802.22 WRAN WG Home Page, IEEE 802.22 Working Group on Wireless Regional Area Networks 5 Enabling Rural Broadband Wireless Access Using Cognitive Radio Technology in TV Whitespaces, http://www. D ieee802.org/22/, pp. 2: Retrieved From Internet Feb. 9, 2011.

\* cited by examiner

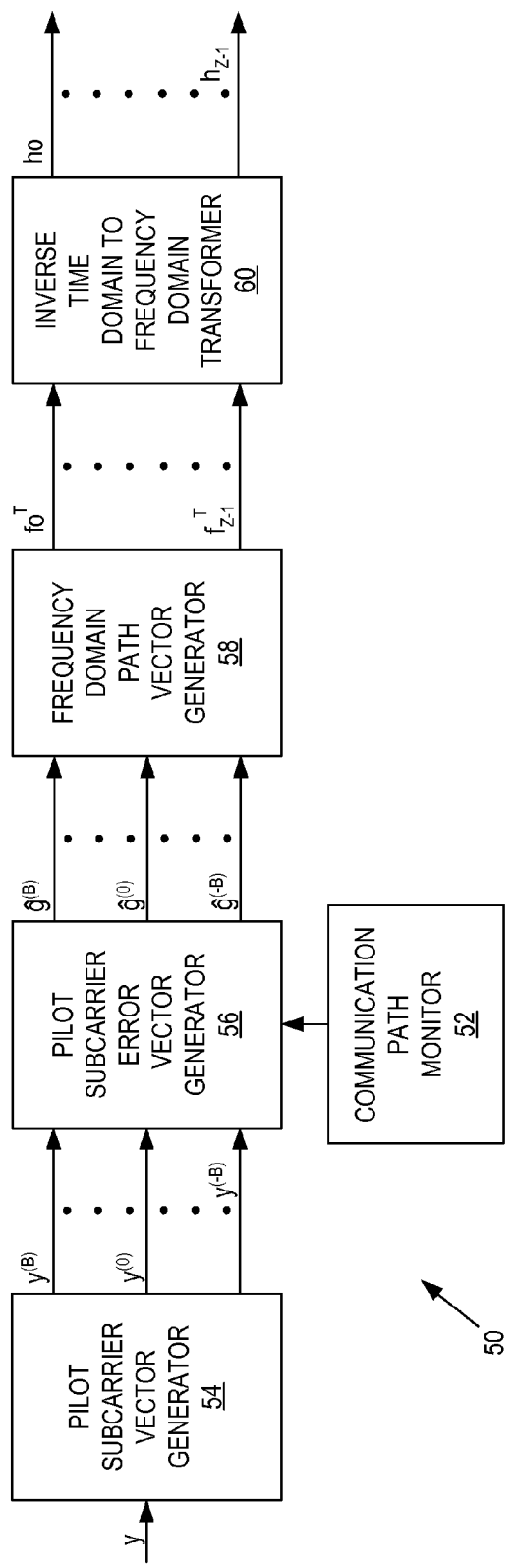
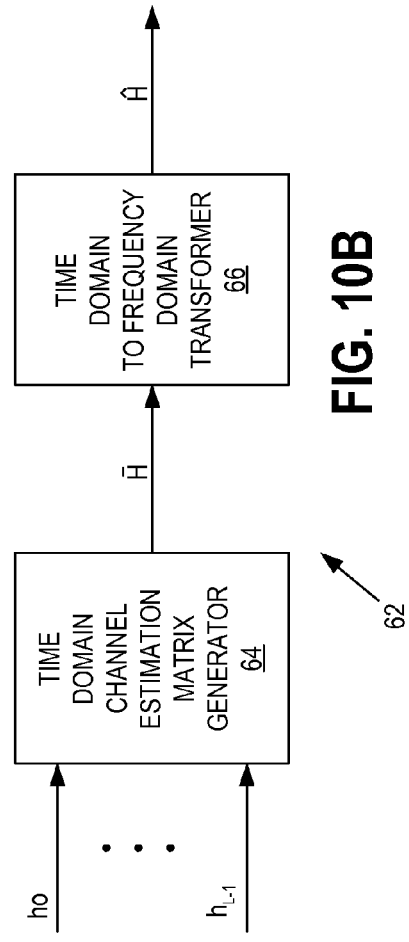
FIG. 10A
FIG. 10B

US 9,020,050 B2

ACCOUNTING FOR INTER-CARRIER INTERFERENCE IN DETERMINING A RESPONSE OF AN OFDM COMMUNICATION CHANNEL

PRIORITY CLAIM

The present application is a Continuation-In-Part of co-pending U.S. patent application Ser. No. 12/579,935, filed Oct. 15, 2009; the present application is also a Continuation-In-Part of co-pending U.S. patent application Ser. No. 12/579,969, filed Oct. 15, 2009; which applications claim priority to U.S. Provisional Patent Application Nos. 61/105,704, filed Oct. 15, 2008; and 61/158,290, filed Mar. 6, 2009; also, the present application claims the benefit of U.S. Provisional Patent Application Ser. No. 61/267,667, filed Dec. 8, 2009; and the present application also claims the benefit of U.S. Provisional Patent Application Ser. No. 61/360,367, filed Jun. 30, 2010; all of the foregoing applications are incorporated herein by reference in their entireties.

SUMMARY

In an embodiment, a channel estimator includes first and second stages. The first stage is operable to generate a respective one-dimensional array of first channel-estimation coefficients for each communication path of a communication channel, and the second stage is operable to generate a multi-dimensional array of second channel-estimation coefficients in response to the first channel-estimation coefficients.

For example, such a channel estimator may estimate the response of a channel over which propagates an orthogonal-frequency-division-multiplexed (OFDM) signal that suffers from inter-carrier interference (ICI) due to Doppler spread. Such a channel estimator may estimate the channel response more efficiently, and with a simpler algorithm (e.g., with an algorithm that does not require a real-time matrix inversion), than conventional channel estimators. Furthermore, such a channel estimator may be able to dynamically account for changes in the number of communication paths that compose the channel, for changes in the delays of these paths, or for changes in the signal energy levels of these paths.

BRIEF DESCRIPTION OF THE DRAWINGS

FIG. 10A is a block diagram of a first stage of an embodiment of the channel estimator of FIG. 9.

FIG. 10B is a block diagram of a second stage of an embodiment of the channel estimator of FIG. 9.

DETAILED DESCRIPTION

Figure 1:
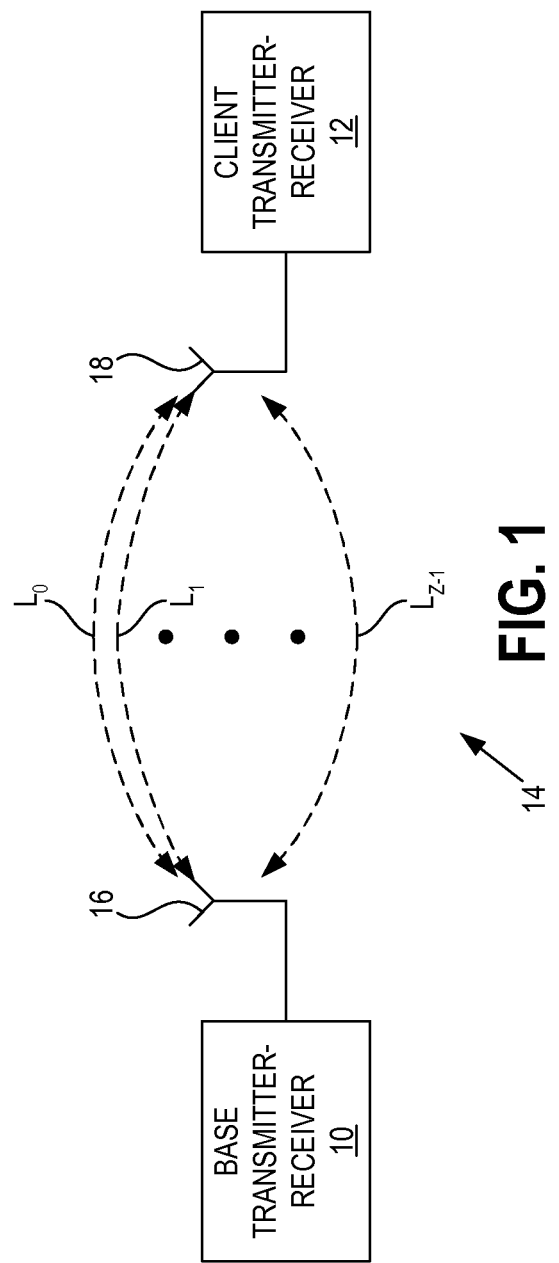
FIG. 1 is a block diagram of an embodiment of base and client orthogonal-frequency-division-multiplexing (OFDM) transmitter-receivers that are not moving significantly relative to one another while they are communicating with one another.

FIG. 1 is a block diagram of an embodiment of a base transmitter-receiver 10 and of a client transmitter-receiver 12, which communicates with the base transmitter-receiver over a wireless channel 14 via multicarrier signals (e.g., OFDM signals) while remaining substantially stationary relative to the base transmitter-receiver. For example, the base 10 may be a wireless router in a home or office, and the client 12 may be a computer that communicates with the base via OFDM signals that have N carriers. One or more antennas 16 are coupled to the base 10, and one or more antennas 18 are coupled to the client 12. Each antenna 16 may function as only a transmit antenna, as only a receive antenna, or as a transmit-receive antenna; and each antenna 18 may function similarly. Furthermore, the channel 14 may include Z multiple paths $L_0$-$L_{z-1}$ over which the multicarrier signals propagate. For example, a first path $L_0$ may be a straight-line path between the antennas 16 and 18, and a second path $L_1$ may be a multi-segmented path that is caused by signal reflections from one or more objects (not shown in FIG. 1) near the base 10, client 12, or channel 14.

Figure 2:
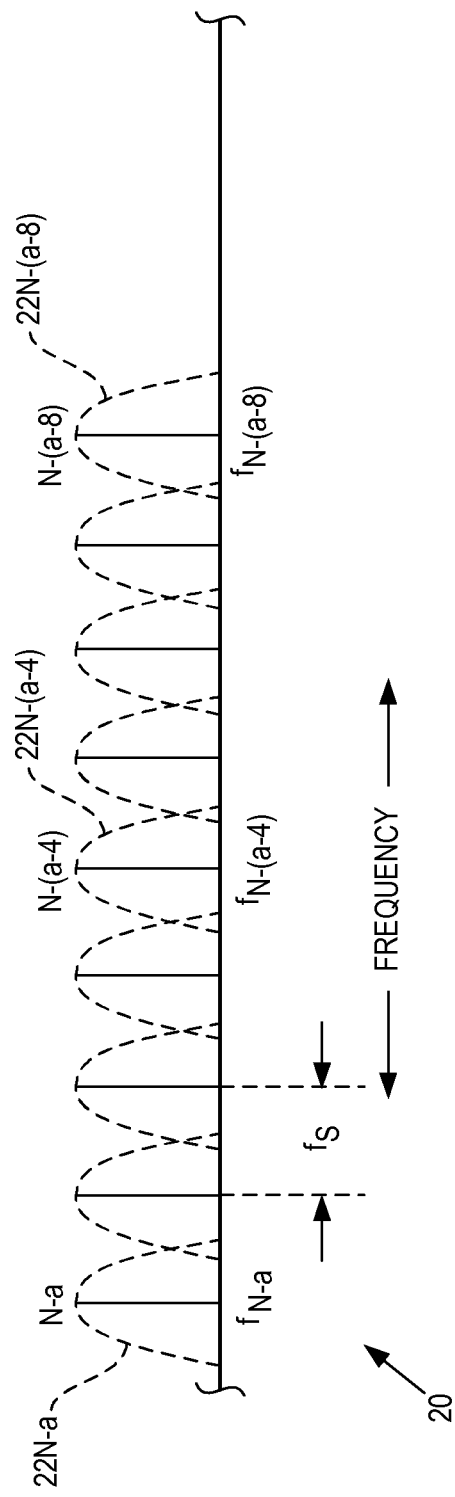
FIG. 2 is a plot of an embodiment of the frequencies of the carrier signals (solid lines) generated by the presently transmitting transmitter-receiver of FIG. 1, and of the frequency "slots" (dashed lines) that these carrier signals may respectively occupy at the presently receiving transmitter-receiver of FIG. 1.

FIG. 2 is a frequency plot of some of the N carriers (here, carriers N-a to N-(a−8) are shown in solid line and are hereinafter called "subcarriers") of an embodiment of an OFDM symbol 20, which may be transmitted by the base 10 of FIG. 1 and received by the client 12, or vice versa—an OFDM symbol is a portion of an OFDM signal that is modulated with the same data subsymbols for a symbol period. Each of the subcarriers N-a to N-(a−8) has a respective frequency $f_{N-a}$-$f_{N-(a-8)}$, and is orthogonal to the other subcarriers. In this context, "orthogonal" means that, in the absence of inter-carrier interference (discussed below) and noise, one may construct a time-domain signal from these modulated subcarriers (e.g., using an Inverse Fast Fourier Transform (IFFT)), and then extract these modulated subcarriers, and the information that they carry, from the time-domain signal (e.g., using a Fast Fourier Transform (FFT)) with no loss of information. Furthermore, although the base 10 is described as transmitting the OFDM signal in the example below, it is understood that this example would be similar if the client 12 were transmitting the OFDM signal.

Referring to FIGS. 1 and 2, the transmitter of the base 10 modulates each of at least some of the N subcarriers with a respective data value (hereinafter a data subsymbol) for a time period hereinafter called a symbol period—the transmitter may not use one or more of the N subcarriers due to, for example, excessive interference at the frequencies of these subcarriers. Examples of suitable modulation schemes include binary phase-shift keying (BPSK), quadrature phase-shift keying (QPSK), and quadrature amplitude modulation (QAM); the latter two schemes providing data subsymbols that each have multiple bits.

The frequency spacing $f_s$ between adjacent ones of the N subcarriers is typically constant, and is conventionally selected to minimize inter-carrier interference (ICI), which is a phenomenon that occurs if energy from one subcarrier "spills over" to the frequency slot of another subcarrier at the receiver of the client 12. At the transmitter of the base 10, each of the active ones of the N subcarriers has a frequency $f_k$ (for k=0 to N−1) represented by a respective one of the solid lines (only the frequencies $f_k$ for k=N-a to N-(a−8) are shown in FIG. 2). But at the receiver of the client 12, the respective frequency $f_k$ of each subcarrier may be effectively shifted within a respective frequency slot 22 indicated by the dashed lines (only the slots 22 of the frequencies $f_k$ for k=N-a to N-(a−8) are shown in FIG. 2). For example, at the receiver of the client 12, the frequency $f_{N-a}$ of the subcarrier N-a may be shifted to another location within the frequency slot $22_{N-a}$, or may be "spread" over multiple locations within this frequency slot. Causes for this frequency shifting/spreading may include, for example, the existence of multiple transmission paths L, and channel conditions (e.g., humidity, temperature) that may effectively shift the respective phase and attenuate the respective amplitude of each modulated subcarrier.

To allow the receiver of the client 12 to recover the data subsymbols in the presence of ICI and other interference or noise, the transmitter of the base 10 transmits an OFDM training symbol—a "training symbol" is the combination of all the training subsymbols transmitted during a training-symbol period—shortly before transmitting an OFDM data symbol—a "data symbol" is the combination of all of the data subsymbols transmitted during an OFDM data-symbol period. That is, the transmitter of the base 10 transmits the training symbol during a first OFDM symbol period, and transmits the data symbol during a second, subsequent OFDM symbol period. Because the receiver of the client 12 "knows" the identity of the transmitted training symbol ahead of time, the receiver characterizes the channel 14 by comparing the received training symbol with the known transmitted training symbol. For example, the receiver may characterize the channel 14 by generating an N×N matrix $\hat{H}$ of estimated complex frequency-domain coefficients that respectively represent the frequency response (e.g., the imparted ICI, amplitude attenuation, and phase shift) of the channel at each of the subcarrier frequencies $f_k$—the "^" indicates that $\hat{H}$ is an estimate of the actual channel matrix H. As discussed in more detail below, the receiver may then use this channel-estimation matrix $\hat{H}$ to recover transmitted data symbols from respective received data symbols.

Figure 3:
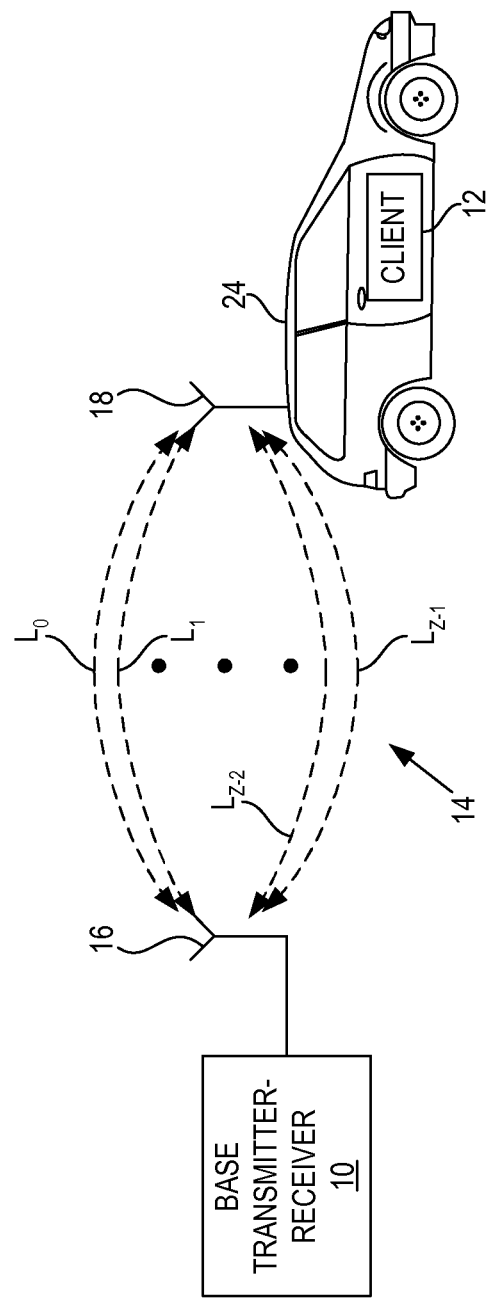
FIG. 3 is a block diagram of an embodiment of base and client OFDM transmitter-receivers that are moving relative to one another while they are communicating with one another.

FIG. 3 is a block diagram of an embodiment of the base transmitter-receiver 10 and of the client transmitter-receiver 12 of FIG. 1, but where the base and client are moving relative to one another at a non-zero velocity (the velocity may be constant or time varying) while they are communicating with one another, and where like numbers refer to components common to FIGS. 1 and 3. For example, the base 10 may be a cell tower, and the client 12 may be an internet phone that is located within a moving automobile 24. The base 10 and the client 12 may communicate with one another according to one or more communications standards that specify OFDM technology for mobile communications. These standards include, for example, the DVB-H standard and the WiMAX standard. Furthermore, although only the client 12 is shown as moving, in other embodiments the base 10 may be moving and the client 12 may be stationary, or both the base and the client may be moving simultaneously.

Figure 4:
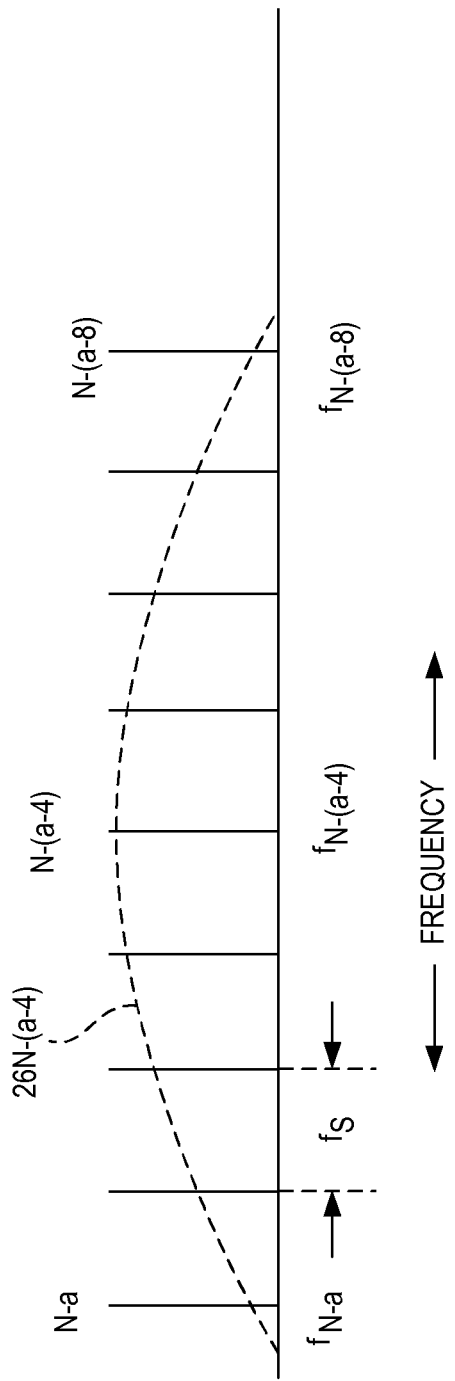
FIG. 4 is a plot of an embodiment of the frequencies of carrier signals (solid lines) generated by the presently transmitting transmitter-receiver of FIG. 3, and of the frequency slot (dashed line) that the center one of these plotted carrier signals may occupy at the presently receiving transmitter-receiver of FIG. 3.

FIG. 4 is a frequency plot of some of the N subcarriers (here, subcarriers N-a to N-(a−8) in solid line) of an embodiment of an OFDM symbol 25 that may be transmitted by the base 10 of FIG. 1 and received by the client 12, or vice versa. Although the base 10 is described as transmitting the OFDM symbol in the example below, it is understood that this example would be similar if the client 12 were transmitting the OFDM symbol.

At the base 10, the OFDM symbol may be similar to the OFDM symbol of FIG. 2 in that the base modulates each of at least some of the N subcarriers with a respective data subsymbol, and each of the data-modulated ones of the N subcarriers has a center frequency $f_k$ represented by a respective one of the solid lines.

But at the receiving client 12, the frequency $f_k$ of a subcarrier k may be shifted/spread by one or more times G as indicated by the frequency slot $26_{N-(a-4)}$ of the subcarrier k=N-(a−4) (only this one frequency slot is shown in FIG. 3 for clarity) such that energy from a subcarrier k may spill over to the frequencies of one or more adjacent subcarriers (e.g., k−1, k+1) on either side of the subcarrier k. For example, in the embodiment shown in FIG. 4, energy from the subcarrier k=N-(a−4) may spill over to the frequencies $f_{N-a}$-$f_{N-(a-3)}$ and $f_{N-(a-5)}$-$f_{N-(a-8)}$ of the subcarriers k=N-a to N-(a−3) and k=N-(a−5) to N-(a−8).

The frequency shifts/spreads of the received OFDM subcarriers of FIG. 4 may be significantly greater than the frequency shifts/spreads of the received OFDM subcarriers of FIG. 2 because, in addition to the causes for this frequency shifting/spreading described above (e.g., the existence of multiple transmission paths L and channel conditions), the received OFDM subcarriers of FIG. 4 may also experience respective Doppler shifts caused by the relative movement between the base 10 and the client 12.

According to the Doppler Effect, the frequency of a signal at a receiver is different from the frequency of the signal at a transmitter if the receiver and transmitter are moving relative to one another at a non-zero velocity. If the receiver and transmitter are moving away from one another, then the frequency of the signal at the receiver is typically lower than the frequency of the signal at the transmitter; conversely, if the receiver and transmitter are moving toward one another, then the frequency of the signal at the receiver is typically higher than the frequency of the signal at the transmitter. For example, a person (receiver) who is listening to the whistle of an approaching train (transmitter) may experience this phenomenon. While the train is moving toward the person, the person perceives the whistle as having a pitch (frequency) that is higher than the pitch that one on the train would perceive the whistle as having. But after the train passes the person, and is thus moving away from him, the person perceives the whistle as having a pitch lower than the pitch that one on the train would perceive the whistle as having.

Consequently, the subcarrier frequencies of the OFDM symbol 25 of FIG. 4 may be influenced by the Doppler Effect in a similar manner at the receiver of the client 12 of FIG. 3.

A measure of the influence that the Doppler Effect has on a single transmitted tone (e.g., an unmodulated subcarrier signal with a constant non-zero amplitude) is the "Doppler Spread", which is the bandwidth that the tone may occupy at the receiver due to the Doppler Effect. For example, suppose that the frequency of the tone is 1,000 Hz at the transmitter, but that at the receiver, due to the non-zero velocity of the receiver relative to the transmitter, the received tone may have a frequency anywhere from 980 Hz to 1,020 Hz depending on the instantaneous velocity. Therefore, in this example, the Doppler Spread=1020 Hz-980 Hz=40 Hz. That is, the Doppler Spread is (40 Hz)/(1000 Hz)=4% of the frequency of the transmitted tone—although expressed here in Hz and as a percentage of the transmitted frequency, the Doppler Spread may be expressed in other quantities as described below.

For mobile OFDM devices, one may characterize the ICI caused by the Doppler Spread of a subcarrier in terms of the highest number of adjacent subcarriers with which the subcarrier may interfere. For example, the total Doppler induced ICI caused by the $50^{th}$ (k=50) subcarrier is greater if energy from this subcarrier spills over to the $48^{th}$, $49^{th}$, $51^{st}$, and $52^{nd}$ subcarriers, and is less if energy from this subcarrier spills over to only the $49^{th}$ and $51^{st}$ subcarriers. In actuality, because the Doppler Spread of a subcarrier may cause the subcarrier to spill over energy into many or all of the other N subcarrier slots to some degree, one may set a Doppler Spread interference threshold below which one subcarrier is deemed to be unaffected by the Doppler Spread of another subcarrier. Therefore, for a mobile OFDM device, the extent of Doppler induced ICI caused by a subcarrier k may be defined in terms of the number of adjacent subcarriers (above and below the subcarrier k in question) that may experience a level of ICI above the Doppler Spread interference threshold for the device. Furthermore, although in some applications one may assume that all of the subcarriers k experience the same Doppler Spread, in other applications, one may decide not to make this assumption.

Consequently, referring to FIGS. 3 and 4, the frequency slots 26 (only the frequency slot $26_{N-(a-4)}$) of the subcarrier N-(a-4) is shown for clarity) each represent the bandwidth that a respective subcarrier transmitted by the base 10 may occupy at the receiving client 12 due to all causes (e.g., the existence of multiple transmission paths L, channel conditions, and Doppler Spread). But when the base 10 and client 12 are moving relative to one another, the greatest contributor to the frequency-slot bandwidth may be the Doppler Spread.

Still referring to FIGS. 3 and 4, because the Doppler Spread of an OFDM signal may vary relatively quickly with time, transmitting a training symbol separately from the data symbol may not allow the receiver of the client 12 to adequately estimate the channel-estimation matrix $\hat{H}$ for the channel 14 as it exists while the OFDM data symbol is being transmitted.

Figure 5:
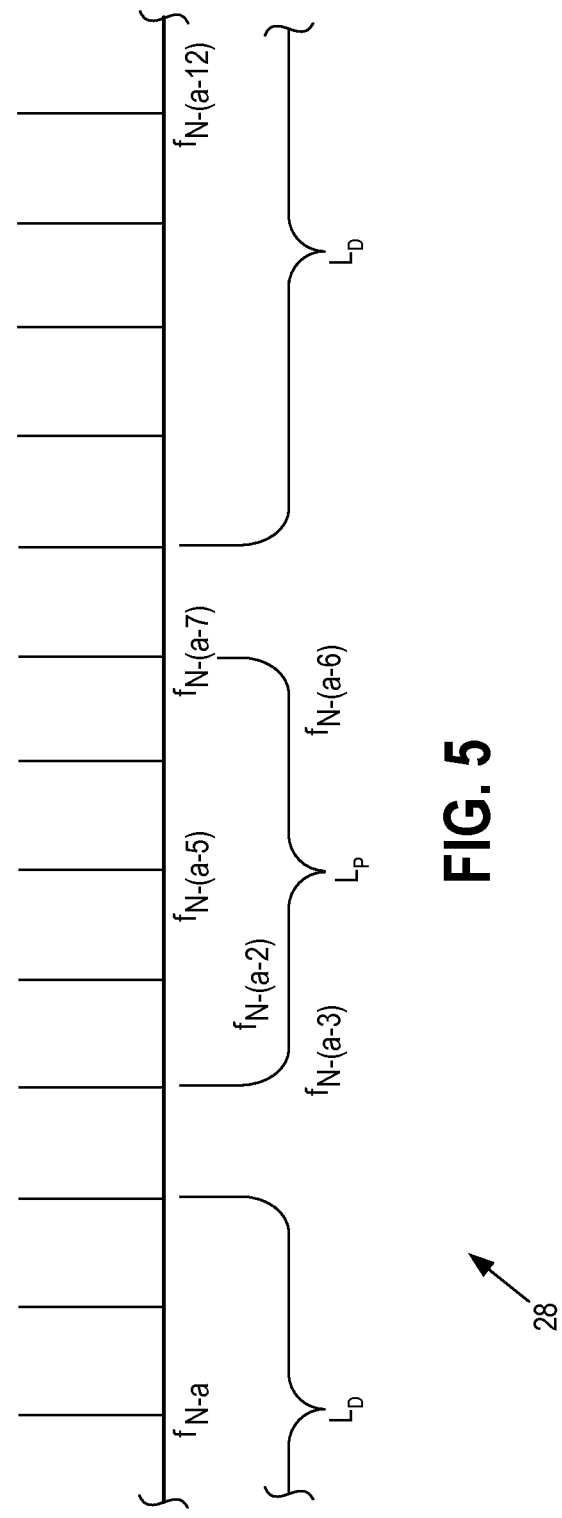
FIG. 5 is a plot of an embodiment of the frequencies of carrier signals generated by the presently transmitting transmitter-receiver of FIG. 3, where the carrier signals are grouped into clusters of data carrier signals (data clusters) and clusters of pilot carrier signals (pilot clusters).

Consequently, mobile OFDM devices, such as the base 10, may combine training subsymbols and data subsymbols into a single OFDM symbol such that a receiving device, such as the client 12, may characterize the channel 14 for the same time period during which the data subsymbols are transmitted. FIG. 5 is a frequency plot of some of the N subcarriers k (here, subcarriers k=N-a to N-(a−12)) of an embodiment of an OFDM symbol 28, which may be transmitted by the base 10 of FIG. 3 and received by the client 12 of FIG. 3, or vice versa, where the OFDM symbol includes both training and data subsymbols. Although the base 10 is described as transmitting the OFDM signal in the example below, it is understood that this example would be similar if the client 12 were transmitting the OFDM signal.

The OFDM symbol 28 includes one or more clusters $L_D$ of data subcarriers, and one or more clusters $L_P$ of training subcarriers, which are hereinafter called "pilot" subcarriers. The transmitter of the base 10 may modulate the pilot subcarriers with respective pilot subsymbols. In an embodiment, the data clusters $L_D$ and the pilot clusters $L_P$ are arranged in alternating fashion (i.e., one after the other such that each data cluster $L_D$ is separated from adjacent data clusters by at least one pilot cluster $L_P$, and such that each pilot cluster is separated from adjacent pilot clusters by at least one data cluster) within the OFDM symbol 28. As discussed below in conjunction with FIGS. 9-10B, because the client 12 receiver "knows" the pilot subsymbols ahead of time, the client may use the pilot subsymbols to more accurately estimate the channel 14 as it exists while the data subsymbols are being transmitted.

In an embodiment, each data cluster $L_D$ within the OFDM symbol 28 includes a same first number (e.g., sixteen) of data subcarriers, and each pilot cluster $L_P$ within the OFDM symbol includes a same second number (e.g., five or nine) of pilot subcarriers. For example, in the embodiment of FIG. 5, the illustrated pilot cluster $L_P$ includes five pilot subcarriers k=N-(a−3) to N-(a−7), and the other pilot clusters (not shown in FIG. 5) of the OFDM symbol 28 also each include five respective pilot subcarriers. But in another embodiment, a data cluster $L_D$ may include a different number of data subcarriers than another data cluster within the same OFDM symbol, and a pilot cluster $L_P$ may include a different number of pilot subcarriers than another pilot cluster within the same OFDM symbol. Furthermore, as discussed above, some of the data subcarriers may be unmodulated by a data subsymbol or may have zero amplitude (i.e., zero energy), and, as discussed below in conjunction with FIGS. 7-8, some of the pilot subcarriers may be unmodulated by a pilot subsymbol or may have zero energy.

A designer of an OFDM receiver, such as the receiver in the client 12 (FIG. 3), may select the minimum number of pilot clusters $L_P$ in the OFDM symbol 28, and may select the minimum number of pilot subcarriers $k_P$ within each pilot cluster, for an intended application of the receiver based on the generally expected conditions of the communication channel 14 (FIG. 3) and on a desired data-error rate. For example, for an application where the receiver may be used in a moving automobile, a designer may use the generally expected conditions of a communication channel between a ground-based transmitter and receiver that are moving relative to one another at speeds between approximately 0 and 150 miles per hour (although non-racing automobiles rarely travel at speeds approaching 150 miles per hour, if the transmitter and receiver are in respective automobiles that are moving in opposite directions, then the speed of one automobile relative to the other automobile may approach or exceed 150 miles per hour). And to maximize the number of data subcarriers in, and thus the data bandwidth of, the OFDM symbol 28, the designer may select the minimum number of pilot clusters $L_P$, and the minimum number of pilot subcarriers within each pilot cluster, that he/she predicts will allow the receiver to estimate such a channel with an accuracy that is sufficient for the receiver to recover data within the desired error rate.

Figure 6:
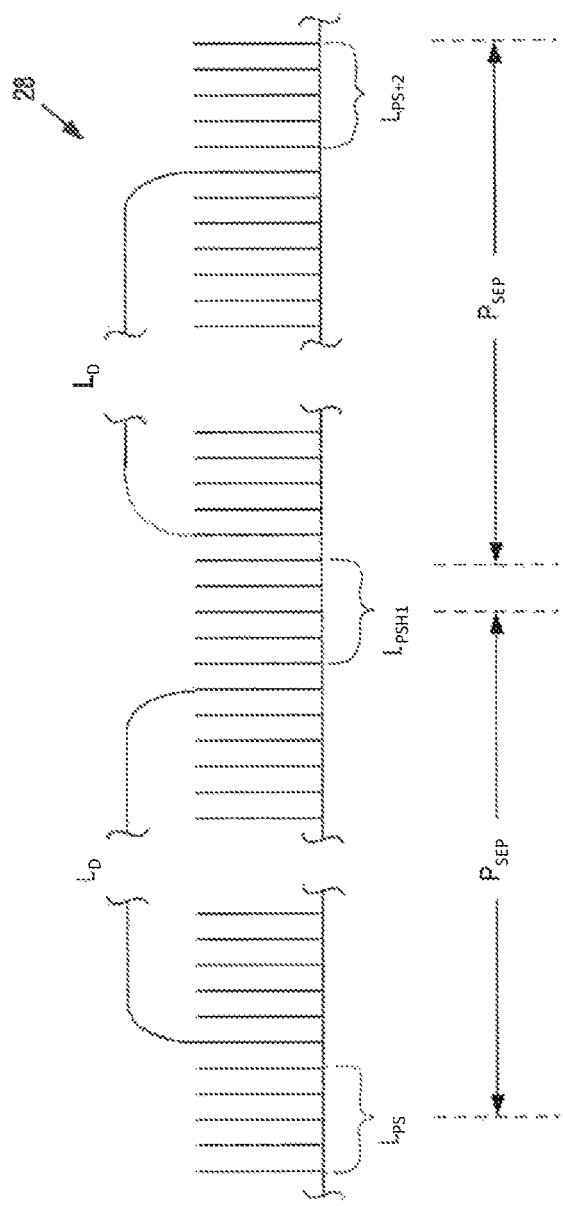
FIG. 6 is a plot of an embodiment of data clusters and pilot clusters generated by the presently transmitting transmitter-receiver of FIG. 3, where the pilot clusters have a uniform separation.

FIG. 6 is a frequency plot of some of the N subcarriers k of an embodiment of the OFDM symbol 28 of FIG. 5, where the frequency (x) axis of FIG. 6 has a lower resolution than the frequency (x) axis of FIG. 5.

In an embodiment, the pilot clusters $L_P$ are separated by a uniform separation value $P_{sep}$, which is the distance, measured in the number of subcarriers k, between a pilot subcarrier in a pilot cluster and a corresponding pilot subcarrier in an adjacent pilot cluster. That is, a pilot subcarrier that occupies a relative position within a pilot cluster $L_P$ is $P_{sep}$ subcarriers away from a pilot subcarrier that occupies the same relative position within an adjacent pilot cluster. For example, as shown in FIG. 6, the center pilot subcarrier (relative position 0) in pilot cluster $L_{PS}$ is separated from the center pilot subcarrier (also relative position 0) in the pilot cluster $L_{PS+1}$ by $P_{sep}$ subcarriers k. Also as shown in FIG. 6, the last pilot subcarrier (relative position +2 in this example) in $L_{PS+1}$ is separated from the last pilot subcarrier (also relative position +2 in this example) in the pilot cluster $L_{PS+2}$ by $P_{sep}$ subcarriers k. And, although not shown in FIG. 6, the very first pilot cluster $L_{P0}$ in the OFDM symbol 28 is separated from the very last pilot cluster $L_{P(Np-1)}$ in the OFDM symbol by $P_{sep}$ when this separation is calculated modulo N.

Figure 7:
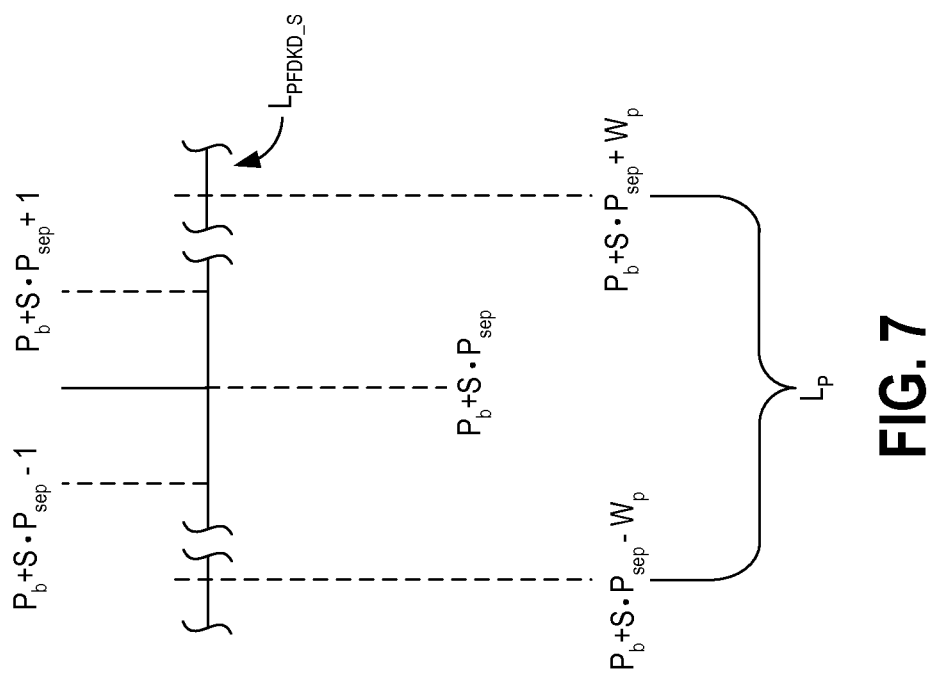
FIG. 7 is a plot of an embodiment of a pilot cluster.

FIG. 7 is a frequency plot of an embodiment of a Frequency-Domain Kronecker Delta (FDKD) pilot cluster $L_{PFDKD\_S}$.

Before substantive characteristics of the pilot cluster $L_{PFDKD\_S}$ are discussed, a convention for identifying a pilot cluster, such as the pilot cluster $L_{PFDKD\_S}$, and its pilot subcarriers is discussed. In this convention, $P_b$ identifies the relative location of the center subcarrier within the pilot cluster, S identifies the relative location of the pilot cluster within an OFDM symbol, and $W_p$ is the number of pilot subcarriers to the left and to the right of the center pilot subcarrier. For example, if the pilot cluster $L_{PFDKD\_S}$ includes five pilot subcarriers, then $W_p=(5-1)/2=2$, and the pilot cluster $L_{PFDKD\_S}$ includes pilot subcarriers at the following relative locations: $P_b-2$, $P_b-1$, $P_b$, $P_b+1$, and $P_b+2$. And one may convert the relative-location identifiers into absolute-location identifiers by adding $S \cdot P_{sep}$ to each of the relative-location identifiers. So, continuing with the above example, the pilot cluster $L_{PFDKD\_S}$ includes pilot subcarriers at the following absolute locations: $P_b+S \cdot P_{sep}-2$, $P_b+S \cdot P_{sep}-1$, $P_b+S \cdot P_{sep}$, $P_b+S \cdot P_{sep}+1$, and $P_b+S \cdot P_{sep}+2$. And, therefore, again in this example, the pilot cluster $L_{PFDKD\_S}$ includes the following pilot subcarriers: $k_{Pb+S \cdot Psep-2}$, $k_{pb+S \cdot Psep-1}$, $k_{Pb+S \cdot Psep}$, $k_{Pb+S \cdot Psep+1}$, and $k_{Pb+S \cdot Psep+2}$. For example, if each pilot cluster $L_{PFDKD\_S}$ in an OFDM symbol includes five pilot subcarriers, and the first pilot subcarrier of the zero$^{th}$ pilot cluster $L_{PFDKD\_0}$ (S=0) is $k_0$, then $P_b=2$, $P_{sep}=8$, and $W_p=2$, and the sixth pilot cluster $L_{PFDKD\_6}$ (S=6 and counting in a direction from the lowest to the highest subcarrier frequency) includes the following pilot subcarriers: $k_{48}$, $k_{49}$, $k_{50}$, $k_{51}$, and $k_{52}$.

Still referring to FIG. 7, in an embodiment, the center subcarrier $k_{Pb+S \cdot Psep}$ (solid line in FIG. 7) of an FDKD pilot cluster $L_{PFDKD\_S}$ is modulated with a non-zero pilot subsymbol, and all of the other subcarriers (dashed lines) have zero energy; that is, all of the other subcarriers are effectively modulated with a zero pilot subsymbol equal to 0+j0. Therefore, in a FDKD pilot cluster $L_{PFDKD\_S}$, the only energy transmitted within the pilot cluster $L_{PFDKD\_S}$ is transmitted on the center subcarrier $k_{Pb+S \cdot Psep}$; the remaining subcarriers in the pilot cluster are transmitted with zero energy. But for reasons discussed above in conjunction with FIG. 4, at the receiver, subcarriers of the pilot cluster $L_{PFDKD\_S}$ other than the center subcarrier may carry non-zero energy due to Doppler spread. And, as discussed below in conjunction with FIGS. 9-10B, the energy carried by the non-center pilot subcarriers at the receiver may allow the receiver to generate an estimate of the communication channel as it exists during transmission of an OFDM symbol, where the estimate takes into account ICI caused by Doppler spread.

Figure 8:
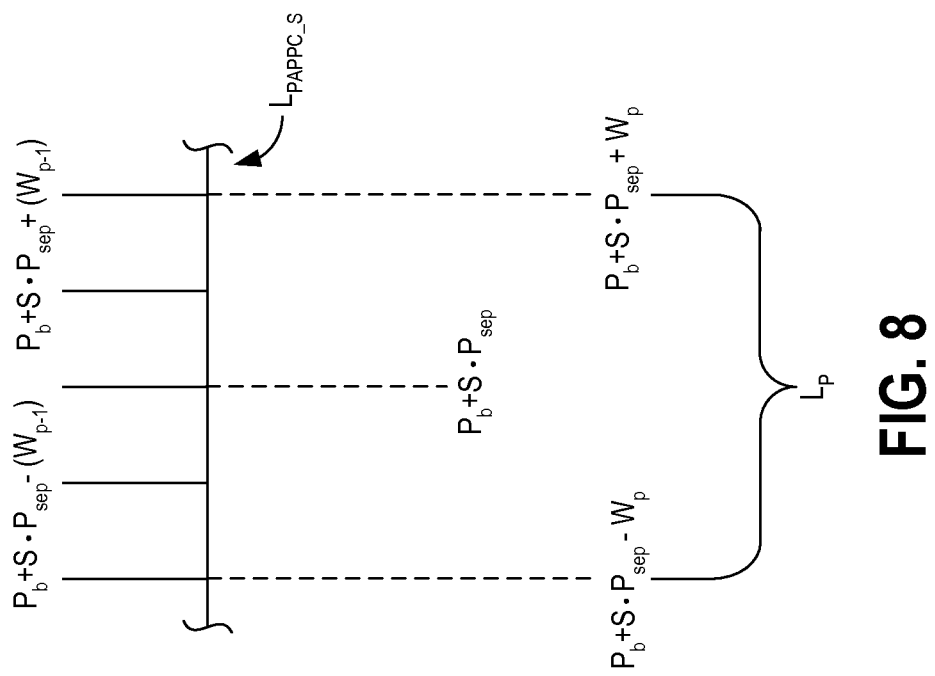
FIG. 8 is a plot of another embodiment of a pilot cluster.

FIG. 8 is a frequency plot of an embodiment of an All-Pilot Pilot Cluster (APPC) $L_{PAPPC\_S}$. Unlike the FDKD pilot cluster $L_{PFDKD\_S}$ of FIG. 7 in which only the center subcarrier $k_{Pb+S \cdot Psep}$ is modulated with a non-zero pilot subsymbol, in an APPC pilot cluster $L_{PAPPC\_S}$, all of the pilot subcarriers (solid lines) $k_{Pb+S \cdot Psep-Wp}$-$k_{Pb+S \cdot Psep+Wp}$ are modulated with a respective non-zero pilot subsymbol. That is, energy is transmitted on all of the pilot subcarriers $k_{Pb+S \cdot Psep-Wp}$ $k_{Pb+S \cdot Psep+-Wp}$ within an APPC pilot cluster. Furthermore, the pilot subcarriers $k_{Pb+S \cdot Psep-Wp}$ $k_{Pb+S \cdot Psep+Wp}$ of an APPC pilot cluster may each be modulated with the same, or with different, pilot subsymbols. And differences between the transmitted pilot subsymbols (which are known ahead of time by the receiver) and the received pilot subsymbols may allow the receiver to generate an estimate of the communication channel as it exists during transmission of an OFDM symbol, where the estimate takes into account ICI caused by Doppler spread.

Figure 9:
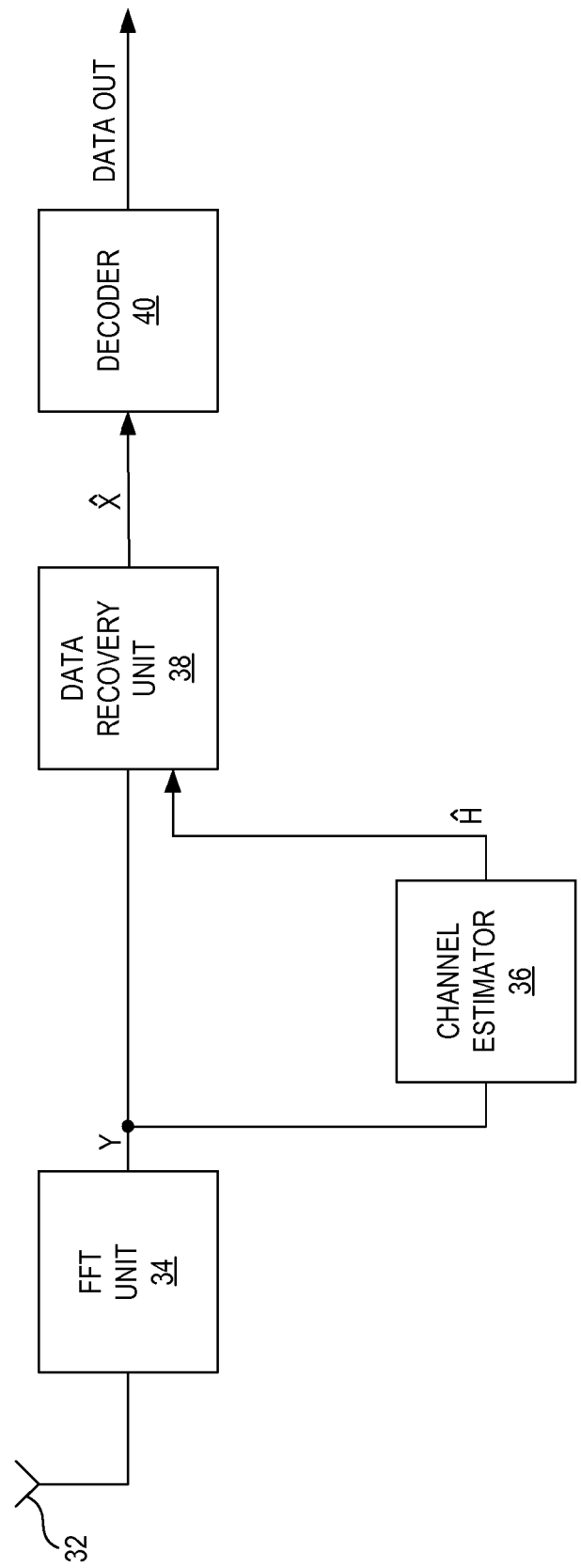
FIG. 9 is a block diagram of an embodiment of the receiver of one or both of the base and client transmitter-receivers of FIG. 3.

FIG. 9 is a block diagram of an embodiment of a receiver 30 for a mobile OFDM device such as the base 10 or client 12 of FIG. 3.

The receiver 30 includes a receive antenna 32, a Fast Fourier Transform (FFT) unit 34, a channel estimator 36, a data-recovery unit 38, and a decoder 40. The FFT unit 34, channel estimator 36, data-recovery unit 38, and decoder 40 may each be implemented in software, hardware, or a combination of software and hardware. For example, one or more of the FFT unit 34, the channel estimator 36, the data-recovery unit 38, and the decoder 40 may be implemented on an integrated circuit (IC), and other components, such as a transmitter, may also be implemented on the same IC, either on a same or different IC die. And this IC may be combined with one or more other ICs (not shown in FIG. 9) to form a system such as the base 10 or client 12 of FIG. 3.

The receive antenna 32 may receive one or more OFDM symbols from a transmitter, such as the transmitter of the base 10 or client 12 of FIG. 3, where at least some of the subcarrier signals may experience Doppler Spread. The antenna 32 may also function to transmit OFDM symbols generated by a transmitter (not shown in FIG. 9) of the OFDM device that incorporates the receiver 30. That is, the antenna 32 may function to both receive and transmit OFDM symbols.

The FFT unit 34 conventionally converts a received OFDM symbol from a time-domain waveform into an N×1 column vector y of complex frequency-domain coefficients (e.g., one complex coefficient for each subcarrier).

The channel estimator 36 estimates the response of the communication channel (e.g., the channel 14 of FIG. 3) from the coefficients of the vector y corresponding to the pilot subcarriers, which, as discussed above in conjunction with FIGS. 5-8, are the subcarriers that compose the training portion of the received OFDM symbol. From these pilot-subcarrier coefficients, the estimator 36 generates an N×N matrix $\hat{H}$ of complex frequency coefficients that collectively approximate the effective frequency response H of the communication channel—the effective frequency response may take into account the affect of, e.g., channel conditions such as temperature and humidity, the existence of multiple transmission paths, and the Doppler Spread, at each of the subcarrier frequencies $f_k$. Because, as discussed above, the Doppler Spread may cause energy from one subcarrier to spill over into the frequency slot of another subcarrier at the receiver 30, the matrix $\hat{H}$ may not be a diagonal matrix—a matrix is diagonal if all of its elements are zero except for the elements that lie along the main diagonal that extends from the top left corner of the matrix. An embodiment of the channel estimator 36, and of a technique for generating the channel-estimation matrix $\hat{H}$, is discussed below in conjunction with FIGS. 10A-10B.

The data-recovery unit 38 recovers the data carried by the OFDM symbol as transmitted by generating an N×1 column vector $\hat{x}$, which is an estimation of the transmitted OFDM symbol. That is, $\hat{x}$ includes complex coefficients (one for at least each data subcarrier) that are estimates of the complex coefficients with which the transmitter modulated the transmitted subcarriers. The unit 38 may generally recover $\hat{x}$ according to the following equations:

$$y = \hat{H}\hat{x} + n \quad (1)$$

$$\hat{H}^{-1}(y) = \hat{H}^{-1}\hat{H}\hat{x} + \hat{H}^{-1}n = \hat{x} + \hat{H}^{-1}n \quad (2)$$

where n is an N×1 vector of additive-white-Gaussian-noise complex coefficients at each of the subcarrier frequencies. Because, as discussed above, some of the y coefficients are for pilot subcarriers that are used only for channel-estimation purposes, the elements of $\hat{H}$, $\hat{x}$, y and n that correspond to the $N_p(2W_p+1)$ pilot subcarriers (where $N_p$ is the number of pilot clusters $L_P$ in the OFDM symbol) may be discarded prior to calculating $\hat{H}^{-1}$ and solving equation (2) so as to reduce the complexity, and increase the speed, of the calculation of $\hat{x}$. Examples of a data-recovery unit and data-recovery techniques that may be used as and by the data-recovery unit 38 are disclosed in U.S. patent application Ser. Nos. 12/579,935 and 12/579,969, which were filed on Oct. 15, 2009 and which are incorporated by reference. And conventional data-recovery units and techniques that may be respectively used as and by the data-recovery unit 38 also exist.

The data decoder 40 effectively uses the $\hat{x}$ coefficients that correspond to the data subcarriers of the OFDM symbol to demodulate the corresponding data subsymbols, and to thus recover the data represented by the subsymbols. For example, if the transmitter modulated a data subcarrier by mapping it to a respective QPSK constellation element, then the data decoder 40 QPSK demodulates the data subcarrier to recover the same constellation element, which represents the bits of data carried by the modulated data subcarrier.

Still referring to FIG. 9, although conventional channel estimators exist, such a channel estimator may require a relatively long processing time to obtain $\hat{H}$. For example, a significant portion of the processing time required by a conventional channel estimator may be due to the calculating of one or more inverted matrices in real time as part of the algorithm for determining $\hat{H}$.

And referring to FIGS. 3 and 9, a conventional channel estimator may also be unable to account for changes in the number of the paths L that compose the communication channel 14, for changes in the respective delays of these paths, and for changes in the respective portions of the OFDM signal energy carried by these paths.

Over a period of time that may be much longer than a single OFDM symbol period (e.g., approximately 100-300 OFDM symbol periods), the number Z of paths L may change. The change in the number of paths L may be due to changes in the channel conditions, such as changes in the number of OFDM-signal-reflecting objects within or near the channel 14.

Furthermore, over the same period, the delays of the paths L, and the portions of the OFDM signal energy carried by the paths L, may also change. Each path L is defined by the delay it has relative to the zero[th] path $L_0$ having zero delay. That is, the zero-delay path $L_0$ is the path over which a version of an OFDM signal, having a respective portion of the energy of the transmitted OFDM signal, first reaches the receiver; other versions of the OFDM signal reach the receiver over the remaining paths L at the respective delay times (relative to the delay of the path $L_0$) that define those paths, and with respective portions of the transmitted energy. The delay time of a path L may be defined in units of the OFDM-signal sampling time employed by the receiver. For example, when a version of an OFDM signal propagates over a path $L_I$ having a delay value of 1, this signal version first reaches the receiver one sample time, or one sample, after the version of the OFDM signal that is propagating over the path $L_0$ first reaches the receiver. Likewise, when a version of an OFDM signal propagates over a path $L_I$ having a delay value of 3.5, this signal version first reaches the receiver three-and-one-half samples after the version of the OFDM signal that is propagating over the path $L_0$ first reaches the receiver.

Unfortunately, a channel estimator that does not account for changes in at least one of the number, delays, and energies of the paths L may be unable to determine the channel-estimation matrix $\hat{H}$ with an accuracy sufficient for some applications such as mobile OFDM.

FIGS. 10A-10B are collectively a block diagram of an embodiment of the channel estimator 36 of FIG. 9, wherein the channel estimator may determine the channel-estimation matrix $\hat{H}$ without calculating the inverse of a matrix in real time, and by accounting for changes in the number, delays, and energies of the paths L of the communication channel 14 (FIG. 3).

Referring to FIG. 10A, the channel estimator 36 includes a first stage 50 for generating time-domain path column vectors $h_I$, which each include coefficients that represent the estimated time-domain response of a respective communication path $L_I$ during an OFDM symbol period, where the index I=0−Z−1, and where Z is the number of paths L in the communication channel 14 (FIG. 3).

The first stage 50 includes a communication-path monitor 52, a pilot-subcarrier-vector generator 54, a pilot-subcarrier-error-vector generator 56, a frequency-domain-path-vector generator 58, and a frequency-domain-to-time-domain transformer 60.

The communication-path monitor 52 tracks changes to the number, delays, and energies of the communication paths L, periodically updates a communication-path vector c, and makes the vector c and path energies available to the pilot-subcarrier-error-vector generator 56. The number of elements in the vector c equal the number of communications paths L, and the values of these elements equal the respective delays of the paths. For example, if there are four paths L with delays of 0, 1, 3, and 4, then the vector c=[0, 1, 3, 4] (for reasons discussed above in conjunction with FIG. 9, the first element of the vector c always corresponds to the zero[th] path $L_0$, and thus always equals 0). Similarly, if there are two paths L with delays of 0 and 2, then the vector c=[0, 2]. The vector c may not contain information regarding the portions of the transmitted-OFDM-symbol energy carried by each path; therefore, the monitor 52 may provide these energy portions to the pilot-subcarrier-error-vector generator 56 separately from the vector c. The operation of an embodiment of the monitor 52 is further discussed below.

The pilot-subcarrier-vector generator 54 generates column vectors $y^{(i)}$ from respective groups of the pilot subcarriers, where the index $i=-W_p/2$ to $+W_p/2$. The operation of an embodiment of the generator 54 is further discussed below.

The pilot-subcarrier-error-vector generator 56 generates column error vectors $\hat{g}^{(i)}$ from the respective column vectors $y^{(i)}$, where each vector $\hat{g}^{(i)}$ is a collection of the ith element of the frequency-domain transform for all of the time-domain paths L in the communication channel 14 (FIG. 3). The operation of an embodiment of the generator 56 is further discussed below.

The frequency-domain-path-vector generator 58 generates a respective column vector $f_I$ of frequency-domain coefficients for each communication path $L_I$ for I=0 to Z−1. The operation of an embodiment of the generator 58 is further discussed below.

The frequency-domain-to-time-domain transformer 60 converts each of the frequency-domain path vectors $f_I$ into a corresponding one of the time-domain path vectors $h_I$. For example, the transformer 60 may be an IFFT. The operation of the transformer 60 is further discussed below.

Referring to FIG. 10B, the channel estimator 36 also includes a second stage 62 for converting the time-domain path column vectors $h_I$ from the first stage 50 into the channel-estimation matrix $\hat{H}$ of estimated frequency-domain channel coefficients.

The second stage 62 includes a time-domain-channel-estimation-matrix generator 64, and a time-domain-to-frequency-domain transformer 66.

The time-domain-channel-estimation-matrix generator 64 generates an intermediate channel-estimation matrix $\bar{H}$ of estimated time-domain channel coefficients from the time-domain path vectors $h_I$. The operation of an embodiment of the generator 64 is further discussed below.

And the frequency-domain-to-time-domain transformer 66 converts the intermediate channel-estimation matrix $\bar{H}$ of estimated time-domain channel coefficients into the channel-estimation matrix $\hat{H}$ of estimated frequency-domain channel coefficients. For example, the transformer 66 may be an FFT. The operation of the transformer 66 is further discussed below.

Referring to FIGS. 9-10B, the operation of an embodiment of the channel estimator 36 is described. In this embodiment, it is assumed that the pilot clusters $L_P$ within the transmitted OFDM symbol(s) are FDKD pilot clusters, and that for each OFDM symbol, the center pilot subcarrier of each pilot cluster is modulated with the same pilot subsymbol P, where P is in the frequency domain.

After the activation of the receiver 30, but before the receiver receives an OFDM symbol, the communication-path monitor 52 sets the path vector c to an initial state, which may be set by programming or which the monitor may select from a look-up table (LUT, not shown in FIGS. 9-10B). The initial state includes the number and values of the vector c elements, the number corresponding to the number Z of paths L and the values corresponding to the delays of these paths per above. Where the monitor 52 selects the initial state from an LUT, the LUT may store only one initial state for the vector c, or the LUT may store multiple initial states, and the monitor 52 may select one of the initial states based on measured initial channel conditions such as temperature, humidity, and the speed at which the receiver 30 may be moving (e.g., where the receiver is located in a moving automobile). The unit (e.g., the base 10 or client 12 of FIG. 3) containing the receiver 30 may includes one or more sensors for measuring the channel conditions.

Thereafter, once the receiver 30 begins to receive one or more OFDM symbols, the monitor 52 monitors these signals carrying these symbols to determine the number of paths in the channel 14 (FIG. 3), and the delays and energies of these paths. The monitor 52 may do this by detecting, for each OFDM symbol, the maximum OFDM symbol delay relative to the zero-delay path $L_o$, and then detecting the average energy at each multiple of a delay resolution within this maximum delay. For example, if the maximum detected delay is 5 chips—a "chip" is a unit of delay equal to the time between two samples, i.e., equal to one sample period—and the delay resolution is 0.25 chips, then the monitor 52 may monitor the average energy in each of the paths L with delays of 0.25, 0.5, 0.75, 1.0, 1.25, . . . , and 5.0 chips. If the average energy in a monitored path L is greater than or equal to an energy threshold, then the monitor 52 may identify that path as currently existing in the channel; conversely, if the average energy in a monitored path is less than the threshold, then the monitor 52 may identify this path as currently not existing in the channel. For existing paths L that have fractional delays (e.g., 0.75, 1.5, 2.25), the monitor 52 may perform an interpolation such that only paths with integer delays (e.g., 0, 1, 3, 5) are identified as existing paths. The monitor 52 may identify only paths with integer delays as existing paths because the pilot-subcarrier-error-vector generator 56 may use the vector c to select rows or columns of a target matrix as discussed below in conjunction with equation (8), and, in at least some applications, the rows and columns of a matrix are identifiable only with integers; that is, matrices typically are defined as not having a fractional row or column such as 3.35. Alternatively, the monitor 52 may convert all of the elements of the vector c to integers by multiplying each element by the reciprocal of the minimum resolvable incremental delay, and then expanding the target matrix. For example, if the minimum incremental delay is 0.25 and c is used to select one or more columns of the target matrix, then the monitor 52 may multiply all of the elements of c by 1/0.25=4, and the channel estimator 36 or other component of the receiver system may expand the number of columns in the target matrix by 4 (ahead of time or in real time) by interpolation. In this manner, the elements of c correspond to respective columns of the target matrix without interpolating the elements of c. Or, put another way, one may perform interpolation on the elements of the target matrix instead of on the elements of the vector c.

Next, the communication-path monitor 52 periodically updates the vector c to reflect the number of paths L that exist at the time of the updating, and the delays of these paths; the monitor may also update, at the same times, the portions of the transmitted OFDM-symbol energy carried by these paths on average over the updating period. For example, the monitor 52 may update the vector c and the average path energies once every v received OFDM symbols, where v may range approximately between 100 and 300. Or, the monitor 52 may update the vector c and the average path energies at fixed time intervals, e.g., once every approximately 0.5 to 1.0 seconds.

In an embodiment, the communication-path monitor 52 may determine the number of paths and the delays and energies of these paths, may periodically update the vector c and the path energies, and may perform other operations as described in Simeone et al., *Pilot Based Channel Estimation For OFDM Systems By Tracking The Delay Subspace*, IEEE Transactions On Wireless Communications, Vol. 3, No. 1, pp. 315-324, January 2004, which is incorporated by reference.

In another embodiment, the communication-path monitor 52 may determine the number of paths and the delays and energies of these paths by examining the eigenvalues and eigenvectors of an autocorrelation matrix A, which is given by the following equation:

$$A = E\{y^{(0)} y^{(0)H}\} \quad (3)$$

where E indicates the expectation (i.e., long-term average), the vector $y^{(0)}$ is described below in conjunction with equation (4), and $^H$ indicates the Hermitian transpose of the preceding vector or matrix (in equation (3), $^H$ indicates the Hermitian transpose of $y^{(0)}$. Each eigenvector of A corresponds to a path L of the channel 14 (FIG. 3), and the eigenvalue of the eigenvector is proportional to the energy of the path L. Therefore, if the eigenvalue is greater than or equal to a selected threshold, then the monitor 52 may identify the path L as having non-zero energy, i.e., as carrying a non-zero portion of the energy of the transmitted OFDM symbol. Conversely, if the eigenvalue is below the selected threshold, then the monitor 52 may identify the path L has having zero energy, i.e., as effectively carrying no portion of the energy of the transmitted OFDM symbol. The monitor 52 may update the matrix A in response to each OFDM symbol, and the monitor 52 may update the vector c and the average path energies once every v received OFDM symbols as discussed above. Or, the monitor 52 may update the vector c and the average path energies at fixed time intervals, e.g., once every approximately 0.5 to 1.0 seconds, as discussed above. Further information regarding determining the number of channel paths L, and the delays and energies of these paths, from a matrix such as the autocorrelation matrix A, and information regarding other related operations, may be found in Yang, *Channel Estimation for OFDM Transmission in Multipath Fading Channels Based on Parametric Channel Modeling*, IEEE Transactions On Communications, Vol. 49, No. 3, March 2001, pp. 467-479, and in Raghavendera, *Exploiting Hopping Pilots for Parametric Channel Estimation in OFDM Systems*, IEEE Signal Processing Letters, Vol. 12, No. 11, November 2005, pp. 737-740, which are incorporated by reference.

Still referring to FIGS. 9-10B, from each received OFDM-symbol column vector y, the pilot-subcarrier-vector generator 54 generates $W_p/2+1$ pilot-subcarrier column vectors $y^{(i)}$ having dimensions $N_p \times 1$ according to the following equation:

$$y^{(i)} = P^* y (p^{(i)})^T \quad i = -W_p/2 \text{ to } +W_p/2 \tag{4}$$

where $N_p$ is the number of pilot clusters in the received OFDM symbol, $P^*$ is the complex conjugate of the pilot subsymbol P, the ( ) operator indicates that that the vector $y^{(i)}$ includes only the elements of the vector y at the locations indicated by the column vector $p^{(i)}$, and $^T$ is the transpose operator, which in this case, indicates that $y^{(i)}$ is a column vector.

The $N_p \times 1$ column vector $p^{(i)}$ of equation (4) is given by the following equation:

$$p^{(i)} = [<P_b + i>, <P_b + P_{sep} + i>, <P_b + 2 \cdot P_{sep} + i>, \ldots, <P_b + (N_p - 1) \cdot P_{sep} + i>]^T \tag{5}$$

where the $<>$ operator indicates modulo arithmetic relative to the total number N of subcarriers in the OFDM symbol, and $N_p$ is the total number of pilot clusters $L_p$ in the OFDM symbol. Modulo arithmetic indicates that it is acceptable to locate a single pilot cluster $L_p$ such that it "wrap arounds" the ends of the OFDM symbol and, therefore, includes the first and last subcarriers of the OFDM symbol. For example, if N=64, $W_p=2$, and $P_b=0$ such that the zero$^{th}$ subcarrier $k_0$ of the OFDM symbol is the center pilot subcarrier of a pilot cluster $L_p$, then $<P_b-2>$ equals 62 to indicate that $k_{62}$ is the $P_b-2$ subcarrier of $L_p$, $<P_b-1>$ equals 63 to indicate that $k_{63}$ is the $P_b-1$ subcarrier of $L_p$, $<P_b-0>$ equals 0 to indicate that $k_0$ is the center subcarrier of $L_p$, $<P_b+1>$ equals 1 to indicate that $k_1$ is the $P_b+1$ subcarrier of $L_p$, and $<P_b+2>$ equals 2 to indicate that $k_2$ is the $P_b+2$ subcarrier of $L_p$.

Per equation (4), each $N_p \times 1$ column vector $y^{(i)}$ includes only elements that correspond to the pilot subcarriers of y in the $i^{th}$ relative position of each pilot cluster $L_P$. For example, for $W_p=2$, $y^{(-1)}$ includes only $N_p$ elements that correspond to the $P_b+S \cdot P_{sep}-1$ pilot subcarriers for S=0 to $(N_p-1)$, $y^{(0)}$ includes only $N_p$ elements that correspond to the $P_b+S \cdot P_{sep}$ pilot subcarriers, and $y^{(+1)}$ includes only $N_p$ elements that correspond to the $P_b+S \cdot P_{sep}+1$ pilot subcarriers.

Also per equation (4), multiplying each element of each vector $y^{(i)}$ by $P^*$ yields an indication of not only the attenuation and phase shift imparted to the OFDM symbol by the channel 14 (FIG. 3) at the frequencies $f_n$ of the pilot subcarriers $k_n$ represented by the elements of $y^{(i)}$, but also yields an indication of the level of Doppler spread that the channel imparts to the OFDM symbol. For example, assume that the pilot subsymbol P is defined by the frequency-domain coefficient 1+j; therefore, $P^*=1-j$. Also, remember that in this example, because the pilot clusters $L_p$ are FDKD pilot clusters, the transmitter modulates only the center subcarrier $P_b+S \cdot P_{sep}$ of each pilot cluster with the subsymbol P, and transmits the remainder of the pilot subcarriers with zero energy. Consequently, if the channel 14 imparts no Doppler spread, no attenuation, and no phase shift to the OFDM signal, (i.e., the channel is "perfect"), then one would expect that all the $N_p$ elements of $y^{(0)}$ would equal $(1-j) \cdot (1+j)=2$, and that all of the elements of $y^{(i)}$ for $i \neq 0$ would equal 0. But if the channel 14 does impart Doppler spread, attenuation, or phase shift to the OFDM signal (i.e., the channel is not perfect), then one would expect that at least some of the elements of $y^{(0)}$ do not equal 2, and that at least some of the elements of $y^{(i)}$ for $i \neq 0$ do not equal 0. In this situation, the values of the elements of $y^{(i)}$ yield information about the channel's frequency response, which includes the level of Doppler spread, attenuation, and phase shift imparted to the OFDM signal; therefore, as discussed below, the channel estimator 36 (FIG. 9) may use the elements of $y^{(i)}$ to estimate the channel's frequency response, and to thus generate a channel-estimation matrix $\hat{H}$.

Furthermore, in an embodiment, the generator 54 generates vectors $y^{(i)}$ for only the center $W_p+1$ pilot subcarriers of each pilot cluster $L_p$ to provide frequency "guard bands" between the data and pilot subcarriers. For example, if each pilot cluster $L_p$ in an OFDM symbol includes five pilot subcarriers (i.e., where $W_p=2$), then the generator 54 generates only vectors $y^{(-1)}$, $y^{(0)}$, and $y^{(+1)}$, which correspond to only the middle three pilot subcarriers of each pilot cluster. That is, in this example, the channel estimator 36 analyzes only the middle three pilot subcarriers of each pilot cluster $L_p$ to estimate the channel 14 (FIG. 3). The theory behind this technique is as follows. In the example where $W_p=2$, it is assumed that the level of Doppler spread imparted by the channel 14 will rarely, if ever, cause energy from the center pilot subcarrier of a pilot cluster $L_p$ to "spill over" into the frequencies of the outer two pilot subcarriers ($W_p=-2$ and $W_p=+2$); consequently, the channel estimator 36 need only analyze the center three pilot subcarriers of each pilot cluster to estimate the channel 14. Furthermore, the outer two pilot subcarriers provide a buffer such that the Doppler spread does not cause energy from the adjacent data subcarriers to spill over into the inner three pilot subcarriers that the channel estimator 36 analyzes; therefore, this buffering action may allow one to simplify the channel-estimation algorithm performed by the channel estimator by preventing energy from the data subcarriers from "corrupting" the channel estimator's calculation of the channel-estimation matrix $\hat{H}$. If, however, the anticipated maximum level of Doppler spread may allow energy from the center pilot subcarrier to spill over onto more than the two immediately adjacent pilot subcarriers, then the transmitter may implement longer pilot clusters $L_p$ to increase the sizes of the guard bands. For example, a pilot cluster $L_p$ with $W_p=4$ yields nine total pilot subcarriers, the inner five pilot subcarriers for channel estimation, and the outer four pilot subcarriers (two subcarriers on either side of the pilot cluster) for forming guard bands that are each two subcarriers wide.

Still referring to FIGS. 9-10B, in an embodiment, the Np×1 column vector $y^{(i)}$ may also be determined according to the following equation:

$$y^{(i)} = F_L^{(0)H} \cdot g^{(-i)} \tag{6}$$

where $F_L^{(0)}$, which is further discussed below, is an $N_p \times Z$ subset of the known N×N Fourier matrix, and where $g^{(-i)}$ is a Z×1 column vector that, as discussed above, effectively separates the channel response into the responses of the paths L of the channel 14 (FIG. 3), and also allows accounting for Doppler spread in the channel.

But calculating $g^{(-i)}$ from equation (6) may yield a channel-estimation matrix $\hat{H}$ that is not accurate enough for some applications where the receiver 30 is moving relative to the transmitter. Reasons for this include that the matrix $F_L$ may not be a square matrix, and that even if $F_L$ is a square matrix, its inverse $F_L^{-1}$ (needed to solve for $g^{(-i)}$ in equation (6)), may yield an estimate of $g^{(-i)}$ that does not yield a sufficiently accurate channel-estimation matrix $\hat{H}$.

Therefore, one may calculate an estimate $\hat{g}^{(i)}$ of $g^{(i)}$ as described below, where $\hat{g}^{(i)}$ may allow the channel estimator 36 to generate a sufficiently accurate channel-estimation matrix $\hat{H}$.

Still referring to FIGS. 9-10B, from each $N_p \times 1$ column vector $y^{(i)}$, the error-vector generator 56 generates a respective $Z \times 1$ error column vector $\psi^{(-i)}_{LMMSE}$ according to the following equation:

$$\psi^{(-i)}_{LMMSE} = (F_L^{(0)H} \cdot N^{(i)-1} \cdot F_L^{(0)} + R_g^{-1})^{-1} \cdot F_L^{(0)H} \cdot N^{(i)-1} \cdot y^{(i)} \quad (7)$$

where Z is the number of channel paths L (i.e., the number of elements in the vector c), LMMSE is an abbreviation for "Linear Minimum Mean Squared Error", $^H$ indicates a Hermitian transpose of a matrix, $F_L^{(0)}$, which is further described below, is an $N_p \times Z$ Fourier path matrix that is a subset of the known $N \times N$ Fourier matrix F, $^{-1}$ indicates a matrix inversion—although in an embodiment this matrix inversion is a standard matrix inversion, in another embodiment this inversion, and other matrix inversions described herein, may be a pseudo inversions such as Moore-Penrose inversions—$N^{(i)}$, which is also further described below, is a $N_p \times N_p$ noise-covariance matrix, and $R_g$, which is also further described below, is a $Z \times Z$ matrix. As discussed below, however, because the matrices $N^{(i)-1}$, $R_g^{-1}$, and $(F_L^{(0)H} \cdot N^{(i)-1} \cdot F_L^{(0)} + R_g^{-1})^{-1}$ may be determined ahead of time and stored in a look-up table, equation (7) may not require the vector generator 56 to invert a matrix in real time.

The $N_p \times Z$ Fourier path matrix $F_L^{(0)}$ of equation (7) is given by the following equation:

$$F_L^{(0)} = F(p^{(0)}, c) \quad (8)$$

where F (the target matrix of $p^{(0)}$ and c in equation (8)) is the known $N \times N$ Fourier matrix, and the ( ) operator indicates that $F_L^{(0)}$ includes the elements of the Fourier matrix F in the $N_p$ rows of F indicated by the elements of the column vector $p^{(0)}$ and in the Z columns of F indicated by the elements of the path vector c. From equation (4), the elements of $p^{(0)}$ include the locations/indices of the center pilot subcarriers of the transmitted OFDM symbol, and the elements of the vector c include the path delays of the paths $L_I$ (I=0–Z–1) that compose the channel 14 (FIG. 3). For example, if the channel 14 includes Z=4 paths L with respective delays of 0, 2, 4, and 7 chips, and if the transmitted OFDM symbol includes N=64 subcarriers $k_0$-$k_{63}$ with 8 pilot clusters $L_{p0}$-$L_{p7}$ having, as their center pilot subcarriers $P_b + S \cdot P_{sep}$, the subcarriers $k_2$, $k_{10}$, $k_{18}$, $k_{26}$, $k_{34}$, $k_{42}$, $k_{50}$, and $k_{58}$, then the Fourier path matrix $F_L^{(0)}$ is an $N_p = 8$ row by Z=4 (8×4) column matrix that includes the elements in rows 2, 10, 18, 26, 34, 42, 50, and 58 of F that are also in the columns 0, 2, 4, and 7 of F. Consequently, the Fourier path matrix $F_L^{(0)}$ includes the elements of the Fourier matrix F that correspond to the center pilot subcarriers, which are the only pilot subcarriers transmitted with nonzero energy, and to the delays of the paths L. Furthermore, because the matrix $F_L^{(0)}$ depends on the path vector c, $F_L^{(0)}$ changes in response to the communication path monitor 52 updating the path vector c; therefore, this tracking of c by $F_L^{(0)}$ may allow the channel estimator 36 to account for changes in the number Z of the paths L and in the delays of these paths, and thus may allow the channel estimator to estimate the channel 14 more accurately than a conventional channel estimator.

The $N_p \times N_p$ matrix $N^{(i)}$ is given by the following equation:

$$N^{(i)} = E\{H(p^{(i)},:) \cdot d \cdot d^H \cdot H^H(p^{(i)},:)\} + \sigma^2 \cdot I_{N_p} \quad (9)$$

where E denotes the mathematical expectation (i.e., the average over a relatively long time) of the resulting matrix inside of the { }, H is the actual channel-response matrix (as compared to the estimated channel-response matrix $\hat{H}$), the operator $(p^{(i)},:)$ indicates that only the elements of H included in the calculation of $N^{(i)}$ are in the rows of H indicated by the elements of $p^{(i)}$ and in all of the columns of H (":" indicates all columns), d is an N×1 column vector of the data subsymbols that modulate the data subcarriers k (elements of d corresponding to the pilot subcarriers equal 0), $\sigma^2$ is the noise variance at each subcarrier $k_n$ of the OFDM symbol (in an embodiment, $\sigma^2$ is the same for all subcarriers), and $I_{N_p}$ is an $N_p \times N_p$ identity matrix having elements of 1 along its top-left-to-bottom-right diagonal and having elements of 0 elsewhere.

Although equation (9) shows the relationship between $N^{(i)}$ and the long term average of the equation involving data d, the channel response H, and the noise variance $\sigma^2$, one may calculate versions of $N^{(i)}$ ahead of time based on anticipated speeds of the receiver 30 relative to the transmitter, an anticipated number Z of paths L in the communication channel 14 (FIG. 3), anticipated delays and energy levels of the paths L, anticipated numbers N of subcarriers in an OFDM symbol, and anticipated locations of the pilot and data clusters within the OFDM symbol. Because of their complexity, the equations for making this calculation are omitted for brevity, but these equations are known. For example, for a given number N of subcarriers and a given pilot-cluster pattern, one may calculate and store in an LUT (not shown in FIGS. 9-10B) ahead of time versions of $N^{(i)}$ for speeds in the range of 0-150 miles per hour (mph) in 5 mph increments and for a number of paths L between 1 and 5 with delays between 0 and 4 chips and with energies of between 10% and 95% of the total received energy. Then, based on the average values of these parameters provided by sensors (not shown in FIGS. 9-10B), e.g., on the automobile, and the monitor 52, the generator 56 may select/update $N^{(i)}$ from these stored versions when the monitor 52 updates the vector c and the path energies. Furthermore, because $N^{(i)}$ depends, at least in part, on the number of paths L and on their delays and energies, periodically updating $N^{(i)}$ may allow the channel estimator 36 to account for changes in the number of paths and the path delays, as well as in the portions of the OFDM-symbol energy carried by the paths L, and thus may allow the channel estimator to estimate the channel 14 more accurately than a conventional channel estimator.

The $Z \times Z$ matrix $R_g^{-1}$ is given by the following equation:

$$R_g^{-1} = E\{g^{(-i)H} g^{(i)}\} \quad (10)$$

Although equation (10) shows the relationship between $R_g^{-1}$ and the long-term average of the vector $g^{(-i)H} g^{(i)}$, one may calculate versions of $R_g^{-1}$ ahead of time based on anticipated speeds of the receiver relative to the transmitter, an anticipated number Z of paths L in the communication channel 14 (FIG. 3), and anticipated delays and energy levels of the paths L. Because of their complexity, the equations for making this calculation are omitted for brevity, but these equations are known. For example, for a given number N of subcarriers and a given pilot-cluster pattern, one may calculate ahead of time versions of $R_g^{-1}$ for speeds in the range of 0-150 miles per hour (mph) in 5 mph increments and for a number of paths L between 1 and 5 with delays between 0 and 4 chips and with energies of between 10% and 95% of the total received energy. Then, based on the average values of these parameters provided by sensors (not shown in FIGS.

9-10B) e.g., on the automobile, and the monitor 52, the generator 56 may select/update $R_g^{-1}$ from these stored versions when the monitor 52 updates the vector c and the path energies. Furthermore, because $R_g^{-1}$ depends, at least in part, on the number of paths, their delays, and their energies, periodically updating $R_g^{-1}$ may allow the channel estimator 36 to account for changes in the number of paths and in the delays of these paths, as well as in the portions of the OFDM-symbol energy carried by the paths, and thus may allow the channel estimator to estimate the channel 14 more accurately than a conventional channel estimator.

Then, based on the speed of the receiver (e.g., the speed of an automobile in which the receiver is located), and the path vector c and the path energies determined by the path monitor 52, the generator 56 may select the appropriate $N^{(i)}$ and $R_g^{-1}$ matrices from an LUT (not shown in FIGS. 9-10B) for use in generating $\psi^{(-i)}_{LMMSE}$ per equation (7).

Furthermore, because, as discussed above, $F_L^{(0)}$ may also be calculated ahead of time (or at least every time that the vector c is updated), then the inverted matrix term $(F_L^{(0)H} \cdot N^{(i)-1} \cdot F_L^{(0)} + R_g^{-1})^{-1}$ of equation (7) may also be calculated ahead of time for different versions of $N^{(i)}$ and $R_g^{-1}$ such that this inverted matrix need not be calculated in real time.

Moreover, further information regarding $N^{(i)}$, $R_g^{-1}$, and $g^{(i)}$ is included in *Pilot-Assisted Time-Varying Channel Estimation for OFDM Systems*, Tang et al., IEEE Transactions On Signal Processing, Vol. 55, No. 5, May 2007, pp. 2226-2238, which is incorporated by reference.

Still referring to FIGS. 9-10B, in another embodiment, from each $N_p \times 1$ column vector $y^{(i)}$, the error-vector generator 56 generates a respective $Z \times 1$ column error vector $\zeta^{(-i)}_{LS}$ according to the following equation:

$$\zeta^{(i)}_{LS} = (F_L^{(0)H} \cdot F_L^{(0)})^{-1} \cdot F_L^{(0)H} \cdot y^{(i)} \quad (11)$$

where LS is an abbreviation of "Least Squares". One may see that $\zeta^{(-i)}_{LS}$ of equation (11) differs from $\psi^{(-i)}_{LMMSE}$ of equation (7) by the terms $N^{(i)}$ and $R_g^{-1}$, and thus may be less complex than $\psi^{(-i)}_{LMMSE}$. But although $\zeta^{(-i)}_{LS}$ may be less complex than $\psi^{(-i)}_{LMMSE}$, for a given OFDM symbol and for given conditions of the channel 14 (FIG. 3), $\zeta^{(-i)}_{LS}$ may cause the channel estimator 36 to yield a channel-estimation matrix $\hat{H}$ that is less accurate than the channel-estimation matrix $\hat{H}$ that $\psi^{(-i)}_{LMMSE}$ may cause the channel estimator to yield. Furthermore, like equation (7), equation (11) does not require the pilot-subcarrier-error-vector generator 56 to invert a matrix in real time because the generator may calculate the inverted matrix $(F_L^{(0)H} \cdot F_L^{(0)})^{-1}$ ahead of time (e.g., in response to each update of the vector c by the communication-path monitor 52) and store it in a LUT (not shown in FIGS. 9-10B).

In an embodiment, one may program the pilot-subcarrier-error-vector generator 56 ahead of time to calculate either $\zeta^{(-i)}_{LS}$ or $\psi^{(-i)}_{LMMSE}$. Alternatively, the generator 56 may switch between calculating $\zeta^{(-i)}_{LS}$ and $\psi^{(-i)}_{LMMSE}$ based on factors such as the condition of the channel 14 (FIG. 3); for example, the generator may calculate $\zeta^{(-i)}_{LS}$ when the channel has a relatively good response, and may calculate $\psi^{(-i)}_{LMMSE}$ when the channel has a relatively bad response. The generator 56, or other portion of the channel estimator 36, may analyze $\hat{H}$ to determine whether the channel 14 is good or bad. Or, the generator may use the one of $\zeta^{(-i)}_{LS}$ and $\psi^{(-i)}_{LMMSE}$ that is more suitable for a good channel for a first number of OFDM symbols, and may then switch over to the other of $\zeta^{(-i)}_{LS}$ and $\psi^{(-i)}_{LMMSE}$ that is more suitable for a bad channel; such a technique may provide suitable results regardless of whether the channel is good or bad without the need to determine whether the channel 14 is good or bad.

Equations (7) and (11), and the estimators $\zeta^{(-i)}_{LS}$ and $\psi^{(-i)}_{LMMSE}$, are further discussed in Chapters 8 and 12 of *Fundamentals of Statistical Signal Processing: Estimation Theory*, Steven M. Kay, Prentice Hall, 1993, which is incorporated by reference.

Still referring to FIGS. 9-10B, in an embodiment, the generator 56 generates $\hat{g}^{(i)}$ according to one of the following equations depending on which of the quantities $\psi^{(-i)}_{LMMSE}$ and $\zeta^{(-i)}_{LS}$ that it generated:

$$\hat{g}^{(i)} = \psi^{(i)}_{LMMSE} \quad (12)$$

or $$\hat{g}^{(i)} = \zeta^{(i)}_{LS} \quad (13)$$

Then, the frequency-domain-path-vector generator 58 generates Z, $N \times 1$ column frequency-domain path vectors $f_I$ according to the following equation:

$$f_I = [\hat{g}^{(0)}(l), \hat{g}^{(-1)}(l), \ldots, \hat{g}^{(-Wp/2)}(l), 0, \ldots, 0, \hat{g}^{(Wp/2)}(l), \ldots, \hat{g}^{(1)}(l)]^T \text{ for } I=0 \text{ to } Z-1 \quad (14)$$

Next, in an embodiment, the inverse-frequency-domain transformer 60 converts each of the frequency-domain path vectors $f_I$ into Z corresponding $N \times 1$ time-domain-path column vectors $h_I$ according to the following equation:

$$h_I = F^H \cdot f_I \text{ for } I=0 \text{ to } Z-1 \quad (15)$$

where F is the $N \times N$ Fourier matrix.

Then, in an embodiment, the time-domain-channel-estimation-matrix generator 64 generates an intermediate $N \times N$ time-domain channel-estimation matrix $\overline{H}$ according to the following equations:

$$\overline{H}(q,r) = 0 \text{ if } <q-r \geq Z \text{ for } q=0 \text{ to } N-1 \text{ for each } r=0 \text{ to } N-1 \quad (16)$$

$$\overline{H}(q,r) = h_{<q-r>}(Z+q) \text{ if } <q-r> < Z \text{ for } q=0 \text{ to } N-1 \text{ for each } r=0 \text{ to } N-1 \quad (17)$$

Next, in an embodiment, the frequency-domain transformer 66 converts the $N \times N$ intermediate matrix $\overline{H}$, which includes estimated time-domain coefficients, into the $N \times N$ channel-estimation matrix $\hat{H}$, which includes estimated frequency-domain coefficients, according to the following equation:

$$\hat{H} = \frac{1}{N} \cdot F \cdot \overline{H} \cdot F^H \quad (18)$$

Still referring to FIGS. 9-10B, alternate embodiments of the channel estimator 36 are contemplated. For example, the channel estimator 36 may be able to estimate the channel 14 (FIG. 3) even when the OFDM symbol includes a pilot cluster $L_p$ other than a FDKD pilot cluster. Furthermore, the components of the channel estimator 36, such as the inverse transformer 60 and the transformer 66, may use transforms other than the Fourier and Inverse Fourier transforms. Moreover, the channel estimator 36 may calculate one or more inverse matrices, such as the inverse matrices in equations (7), (9), (10), and (11), in real time.

Figure 11:
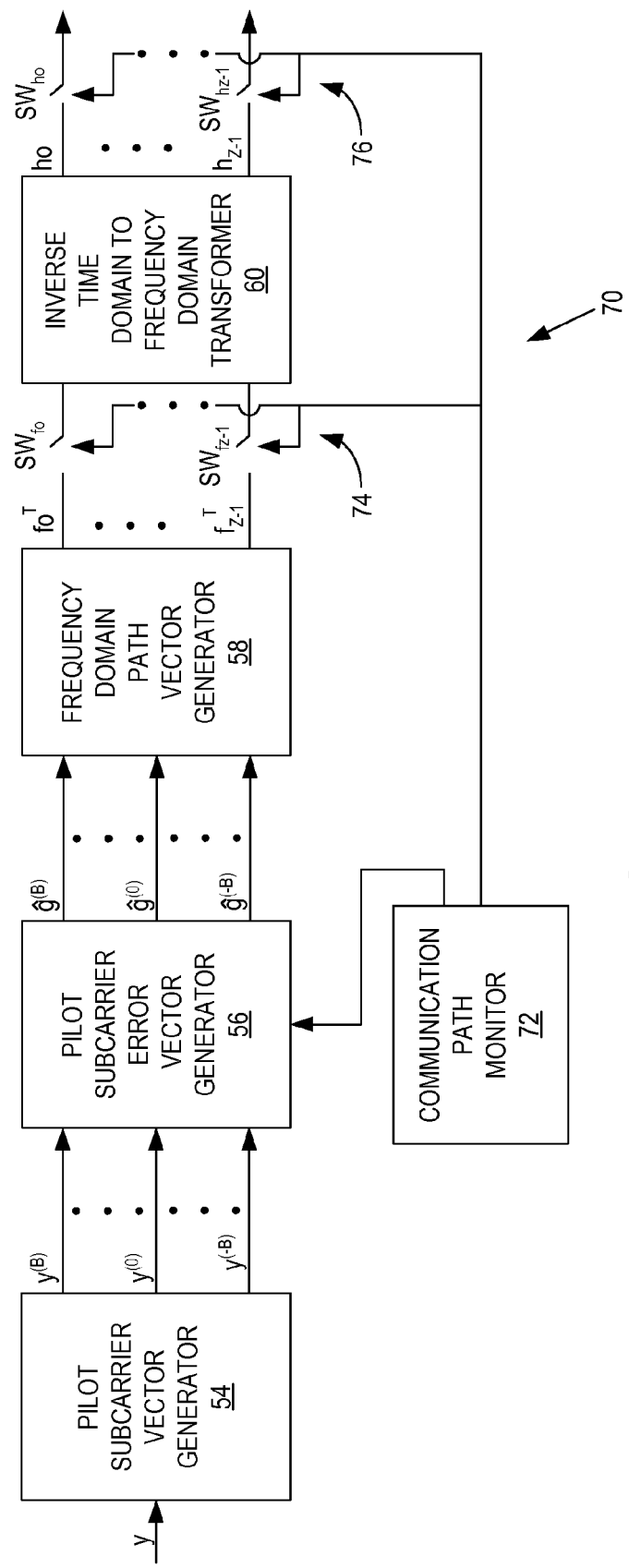
FIG. 11 is a block diagram of a first stage of another embodiment of the channel estimator of FIG. 9.

FIG. 11 is a block diagram of a first stage 70 of another embodiment of the channel estimator 36 of FIG. 9. Like the first stage 50 of FIG. 10A, the first stage 70 includes the pilot-subcarrier-vector generator 54, the pilot-subcarrier-error-vector generator 56, the frequency-domain-path-vector generator 58, and the frequency-domain-to-time-domain transformer 60, which generates the time-domain path column vectors $h_I$. In addition to these components, the first stage 70 also includes a communication-path monitor 72, and banks 74 and 76 of switches $SW_{f0}$-$SW_{fz-1}$ and $SW_{h0}$-$SW_{hz-1}$.

Referring to FIGS. 9 and 11, operation of an embodiment of the first stage 70 is discussed.

The pilot-subcarrier-vector generator 54, the pilot-subcarrier-error-vector generator 56, the frequency-domain-path-vector generator 58, and the frequency-domain-to-time-domain transformer 60 may operate as discussed above in conjunction with FIGS. 9-10B.

The communication-path monitor 72 may track changes to the number, delays, and energies of the communication paths L like the monitor 52 does as discussed above in conjunction with FIGS. 9-10B.

Furthermore, the monitor 72 may generate and update the path vector c like the monitor 52, except that the monitor 72 may maintain the number of elements in the vector c constant, where this constant number equals a maximum number of paths L that the channel 14 (FIG. 3) may include during any OFDM symbol period. For example, the monitor 72 may generate c always having ten elements, even if some of the ten corresponding paths L effectively have zero energy. Designing the monitor 72 to operate in this fashion may reduce the complexity of the monitor by, for example, maintaining constant the dimensions of matrices manipulated by the generator 56, and by maintaining constant the numbers of outputs of the generator 59 and the transformer 60.

But a potential problem with maintaining the vector c at a constant length is that the channel estimator 36 may include information regarding zero-energy paths L in the determination of the channel-estimation matrix $\hat{H}$, and this information may introduce error into $\hat{H}$. More specifically, the generator 56 may generate $\hat{g}^{(i)}$ in response to information in zero-energy paths L, the generator 58 may generate vectors $f_I$ for zero-energy paths, and the transformer 60 may generate vectors $h_I$ for zero-energy paths; and the zero-energy path vectors $f_I$ and $h_I$ may be corrupted by, e.g., noise, because the signal-to-noise ratios (SNRs) of the corresponding zero-energy paths are relatively low.

To avoid potentially introducing error into $\hat{H}$ in response to zero-energy paths L, the monitor 72 may control the switch banks 74 and 76 to prevent the transformer 60 from generating vectors $h_I$ for such paths, and from providing such vectors $h_I$ to the second stage 62 (FIG. 10B) of the channel estimator 36. More specifically, the monitor 72 may open switches $SW_{fl}$ and $SW_{hl}$ corresponding to paths L with effectively zero energy. For example, if a model of the channel 14 (FIG. 3) has a maximum of ten paths L such that c is always ten elements long, then the generator 58 and transformer 60 may each have ten outputs $f_0$-$f_9$ and $h_0$-$h_9$, respectively (not all ten outputs shown in FIG. 11), and the switch banks 74 and 76 may each have ten switches $SW_{f0}$-$SW_{f9}$ and $SW_{h0}$-$SW_{h9}$, respectively (not all switches shown in FIG. 11). And if, at a particular time, the monitor 72 determines that the paths $L_0$, $L_1$, $L_3$, $L_6$, $L_7$, $L_8$, and $L_9$ effectively have zero energy, then the monitor may open the switches $SW_{f0}$, $SW_{f1}$, $SW_{f3}$, $SW_{f6}$, $SW_{f7}$, $SW_{f8}$, and $SW_{f9}$ of the bank 74, and may open the switches $SW_{h0}$, $SW_{h1}$, $SW_{h3}$, $SW_{h6}$, $SW_{h7}$, $SW_{h8}$, and $SW_{h9}$ of the bank 76, such that the transformer 60 does not receive the vectors $f_0$, $f_1$, $f_3$, $f_6$, $f_7$, $f_8$, and $f_9$ and the matrix generator 64 (FIG. 10B) does not receive the vectors $h_0$, $h_1$, $h_3$, $h_6$, $h_7$, $h_8$, and $h_9$. Because the generator 64 does not receive the vectors $h_0$, $h_1$, $h_3$, $h_6$, $h_7$, $h_8$, and $h_9$, the contribution of these vectors to $\hat{H}$ and $\hat{H}$ is zero; consequently, these vectors, which correspond to the zero-energy paths L, do not introduce error into $\hat{H}$.

In another embodiment, the first stage 70 may omit the switch bank 74 and include only one switch bank, the switch bank 76. In such an embodiment, the transformer 60 may still generate vectors $h_I$ corresponding to zero-energy paths, but the corresponding open switches in the switch bank 76 prevents the second stage 62 (FIG. 10B) of the channel estimator 36 (FIG. 9) from receiving such vectors.

From the foregoing it will be appreciated that, although specific embodiments have been described herein for purposes of illustration, various modifications may be made without deviating from the spirit and scope of the disclosure. Furthermore, where an alternative is disclosed for a particular embodiment, this alternative may also apply to other embodiments even if not specifically stated.

The invention claimed is:

1. A channel estimator, comprising:
   a first stage configured to generate a respective one-dimensional array of first channel-estimation coefficients for each communication path of a communication channel; and
   a second stage configured to generate a multi-dimensional array of second channel-estimation coefficients in response to the first channel-estimation coefficients;
   wherein the second stage is configured to generate the multi-dimensional array of second channel-estimation coefficients by
      generating an intermediate multi-dimensional array of third channel-estimation coefficients from the first channel-estimation coefficients, and
      generating the second channel-estimation coefficients equal to a frequency transform of the third channel-estimation coefficients.

2. The channel estimator of claim 1 wherein the first channel-estimation coefficients include time-domain channel-estimation coefficients.

3. The channel estimator of claim 1 wherein the first channel-estimation coefficients include frequency-domain channel-estimation coefficients.

4. The channel estimator of claim 1 wherein the second channel-estimation coefficients include time-domain channel-estimation coefficients.

5. The channel estimator of claim 1 wherein the second channel-estimation coefficients include frequency-domain channel-estimation coefficients.

6. The channel estimator of claim 1 wherein the first stage is configured:
   to receive a signal having a pilot subcarrier; and
   to generate the first channel-estimation coefficients in response to information carried by the pilot subcarrier.

7. The channel estimator of claim 1 wherein: the first channel-estimation coefficients include time-domain coefficients; and the first stage is configured:
   to receive a signal having a pilot subcarrier;
   to generate, in response to information carried by the pilot subcarrier, a respective one-dimensional array of frequency-domain third channel-estimation coefficients for each communication path of the communication channel; and
   to generate in response to each of the arrays of the frequency-domain third channel-estimation coefficients a respective one of the arrays of the time-domain first channel-estimation coefficients.

8. The channel estimator of claim 1 wherein the first stage is configured:
   to generate a one-dimensional array of modified pilot symbols in response to pilot symbols in a same relative location of respective received pilot clusters; and
   to generate the first channel-estimation coefficients in response to the modified pilot symbols.

9. The channel estimator of claim 1 wherein the first stage is configured:
to generate a one-dimensional array of pilot symbols in a same relative location of respective received pilot clusters convolved with reference pilot symbol; and
to generate the first channel-estimation coefficients in response to the convolved pilot symbols.

10. The channel estimator of claim 1 wherein the first stage is configured:
to generate an error vector in response to some, but not all, elements of a multi-dimensional frequency-transform array; and
to generate the first channel-estimation coefficients in response to the error vector.

11. The channel estimator of claim 1 wherein the first stage is configured:
to generate an error vector in response to some, but not all, elements of a multi-dimensional frequency-transform array, and in response to elements of a multidimensional noise-variance array; and
to generate the first channel-estimation coefficients in response to the error vector.

12. The channel estimator of claim 1 wherein the first stage is configured:
to generate an error vector in response to only elements of a multi-dimensional frequency-transform array that are related to a communication path of the communication channel; and
to generate the first channel-estimation coefficients in response to the error vector.

13. The channel estimator of claim 1 wherein the first stage is configured:
to generate an error vector in response to only elements of a multi-dimensional frequency-transform array that are specified by a characteristic of a communication path of the communication channel; and
to generate the first channel-estimation coefficients in response to the error vector.

14. The channel estimator of claim 1 wherein the first stage is configured:
to generate an error vector in response to only elements of a multi-dimensional frequency-transform array that are specified by a delay of a communication path of the communication channel; and
to generate the first channel-estimation coefficients in response to the error vector.

15. The channel estimator of claim 1 wherein the first stage is configured:
to generate an error vector in response to only elements of a multi-dimensional frequency-transform array that are located in a column specified by a delay of a communication path of the communication channel; and
to generate the first channel-estimation coefficients in response to the error vector.

16. The channel estimator of claim 1 wherein:
a difference between location indices of at least one first location of the multi-dimensional array has a first relationship to the number of the communication paths;
a difference between location indices of at least one second location of the multi-dimensional array has a second relationship to the number of communication paths; and
the second stage is configured to generate the multi-dimensional array of second channel-estimation coefficients by:
populating the at least one first location of the multi-dimensional array with a constant; and
populating the at least one second location of the multi-dimensional array with a respective first channel-estimation coefficient.

17. The channel estimator of claim 16, wherein:
the first relationship includes the difference modulo a number of subcarriers from the communication channel being greater than the number of communication paths; and
the second relationship includes the difference modulo the number of subcarriers being less than or equal to the number of communication paths.

18. The channel estimator of claim 16, wherein the constant equals zero.

19. A receiver, comprising:
a channel estimator, including
a first stage configured to generate a respective one-dimensional array of first channel-estimation coefficients for each communication path of a communication channel; and
a second stage configured to generate a multi-dimensional array of second channel-estimation coefficients in response to the first channel-estimation coefficients;
wherein the second stage is configured to generate the multi-dimensional array of second channel-estimation coefficients by
generating an intermediate multi-dimensional array of third channel-estimation coefficients from the first channel-estimation coefficients, and
generating the second channel-estimation coefficients equal to a frequency transform of the third channel-estimation coefficients.

20. The receiver of claim 19, further comprising:
an antenna configured to receive an orthogonal-frequency-divisional-multiplexed signal over the communication channel; and
wherein the first stage of the channel estimator is configured to generate the first channel-estimation coefficients in response to the received signal.

21. The receiver of claim 19, further comprising:
a transform unit configured to convert an orthogonal-frequency-divisional-multiplexed signal from the communication channel into frequency-domain coefficients; and
wherein the first stage of the channel estimator is configured to generate the first channel-estimation coefficients in response to the frequency-domain coefficients of the signal.

22. The receiver of claim 19, further comprising a data-recovery unit configured to recover data carried by an orthogonal-frequency-divisional-multiplexed signal from the communication channel in response to the second channel-estimation coefficients.

23. The receiver of claim 19, further comprising:
a data-recovery unit configured to recover coded data carried by an orthogonal-frequency-divisional-multiplexed signal from the communication channel in response to the second channel-estimation coefficients; and
a decoder configured to decode the recovered coded data.

24. The receiver of claim 19, further comprising a processor configured to control a function of the channel estimator.

25. The receiver of claim 19, further comprising a processor configured to implement the channel estimator.

26. A communication unit, comprising:
a receiver configured to receive a first orthogonal-frequency-division-multiplexed signal from a channel having a communication path, the receiver including
a channel estimator, including
   a first stage configured to generate, from the first signal, a respective one-dimensional array of first channel-estimation coefficients for each communication path of the channel; and
   a second stage configured to generate a multi-dimensional array of second channel-estimation coefficients in response to the first channel-estimation coefficients;
   wherein the second stage of said channel estimator is configured to generate the multi-dimensional array of second channel-estimation coefficients by
      generating an intermediate multi-dimensional array of third channel-estimation coefficients from the first channel-estimation coefficients, and
      generating the second channel-estimation coefficients equal to a frequency transform of the third channel-estimation coefficients; and
a transmitter configured to transmit a second orthogonal-frequency-division-multiplexed signal.

27. The communication unit of claim 26, further comprising an antenna configured:
to provide the first signal to the receiver; and
to receive the second signal from the transmitter.

28. A system, comprising:
a first communication unit, including
   a first receiver configured to receive a first orthogonal-frequency-division-multiplexed signal from
      a channel having a communication path, the receiver including
         a channel estimator, including a first stage configured to generate, from the first signal, a respective one-dimensional array of first channel-estimation coefficients for each communication path of the channel; and
         a second stage configured to generate a multi-dimensional array of second channel-estimation coefficients in response to the first channel-estimation coefficients;
         wherein the second stage is configured to generate the multi-dimensional array of second channel-estimation coefficients by
            generating an intermediate multi-dimensional array of third channel-estimation coefficients from the first channel-estimation coefficients, and
            generating the second channel-estimation coefficients equal to a frequency transform of the third channel-estimation coefficients; and
   a first transmitter configured to transmit a second orthogonal-frequency-division-multiplexed signal; and
a second communication unit, including
   a second receiver operable to receive the second signal from the first transmitter; and
   a second transmitter operable to transmit the first signal to the first receiver.

29. A channel estimation method comprising:
generating a respective one-dimensional array of first channel-estimation coefficients for each communication path of a communication channel using a first stage; and
generating a multi-dimensional array of second channel-estimation coefficients in response to the first channel-estimation coefficients using a second stage by
   generating an intermediate multi-dimensional array of third channel-estimation coefficients from the first channel-estimation coefficients, and
   generating the second channel-estimation coefficients equal to a frequency transform of the third channel-estimation coefficients.

30. The method of claim 29 wherein the first channel-estimation coefficients include time-domain channel-estimation coefficients.

31. The method of claim 29 wherein the first channel-estimation coefficients include frequency-domain channel-estimation coefficients.

32. The method of claim 29 wherein the second channel-estimation coefficients include time-domain channel-estimation coefficients.

33. The method of claim 29 wherein the second channel-estimation coefficients include frequency-domain channel-estimation coefficients.

34. The method of claim 29 further comprising:
receiving a signal having a pilot subcarrier using the first stage; and
generating the first channel-estimation coefficients in response to information carried by the pilot subcarrier using the first stage.

* * * * *